United States Patent
Kang et al.

(10) Patent No.: US 11,778,174 B2
(45) Date of Patent: Oct. 3, 2023

(54) METHOD AND APPARATUS FOR INTRA-PREDICTION CODING OF VIDEO DATA

(71) Applicants: Hyundai Motor Company, Seoul (KR); Kia Corporation, Seoul (KR); Ewha University-Industry Collaboration Foundation, Seoul (KR)

(72) Inventors: Je Won Kang, Seoul (KR); Sang Hyo Park, Seoul (KR); Seung Wook Park, Gyeonggi-do (KR); Wha Pyeong Lim, Gyeonggi-do (KR)

(73) Assignees: Hyundai Motor Company, Seoul (KR); Kia Corporation, Seoul (KR); Ewha University-Industry Collaboration Foundation, Seoul (KR)

( * ) Notice: Subject to any disclaimer, the term of this patent is extended or adjusted under 35 U.S.C. 154(b) by 184 days.

(21) Appl. No.: 17/520,057

(22) Filed: Nov. 5, 2021

(65) Prior Publication Data

US 2022/0086435 A1 Mar. 17, 2022

Related U.S. Application Data

(63) Continuation of application No. 17/276,540, filed as application No. PCT/KR2020/008910 on Jul. 8, 2020, now Pat. No. 11,284,073.

(30) Foreign Application Priority Data

Jul. 8, 2019 (KR) .................. 10-2019-0082130
Aug. 21, 2019 (KR) .................. 10-2019-0102494
(Continued)

(51) Int. Cl.
*H04N 19/11* (2014.01)
*H04N 19/105* (2014.01)
(Continued)

(52) U.S. Cl.
CPC .......... *H04N 19/11* (2014.11); *H04N 19/105* (2014.11); *H04N 19/139* (2014.11);
(Continued)

(58) Field of Classification Search
CPC .... H04N 19/11; H04N 19/105; H04N 19/139; H04N 19/159; H04N 19/167;
(Continued)

(56) References Cited

U.S. PATENT DOCUMENTS

2017/0347103 A1  11/2017  Yu et al.
2018/0205951 A1   7/2018  Hsiang et al.
(Continued)

FOREIGN PATENT DOCUMENTS

KR    10-2019-0069613 A    6/2019
KR       10-1989160 B1      6/2019

OTHER PUBLICATIONS

Extended European Search Report for European Patent Application No. 20836667.4, dated Feb. 3, 2023, 10 pages.
(Continued)

*Primary Examiner* — Francis Geroleo
(74) *Attorney, Agent, or Firm* — Fox Rothschild LLP

(57) ABSTRACT

An apparatus for decoding video data includes a decoder configured to decode, from a bitstream, a syntax element indicating an intra-prediction type of a current block of the video data, and an intra-predictor configured to generate a prediction block for the current block by selectively performing matrix based intra-prediction (MIP) or regular intra-prediction based on the intra-prediction type of the current block indicated by the syntax element.

11 Claims, 11 Drawing Sheets

(30) Foreign Application Priority Data

| Aug. 21, 2019 | (KR) | 10-2019-0102495 |
| --- | --- | --- |
| Oct. 6, 2019 | (KR) | 10-2019-0123492 |
| Jul. 8, 2020 | (KR) | 10-2020-0083979 |

(51) Int. Cl.
- *H04N 19/139* (2014.01)
- *H04N 19/159* (2014.01)
- *H04N 19/167* (2014.01)
- *H04N 19/176* (2014.01)
- *H04N 19/70* (2014.01)

(52) U.S. Cl.
CPC ......... *H04N 19/159* (2014.11); *H04N 19/167* (2014.11); *H04N 19/176* (2014.11); *H04N 19/70* (2014.11)

(58) Field of Classification Search
CPC .... H04N 19/176; H04N 19/70; H04N 19/157; H04N 19/593; H04N 19/117; H04N 19/132; H04N 19/186
See application file for complete search history.

(56) References Cited

U.S. PATENT DOCUMENTS

| 2019/0028701 A1* | 1/2019 | Yu | H04N 19/11 |
| --- | --- | --- | --- |
| 2020/0021810 A1 | 1/2020 | Li et al. | |
| 2020/0322620 A1 | 10/2020 | Zhao et al. | |
| 2020/0344468 A1 | 10/2020 | Lin et al. | |
| 2020/0359033 A1 | 11/2020 | Ramasubramonian et al. | |
| 2020/0359037 A1 | 11/2020 | Ramasubramonian et al. | |
| 2020/0359050 A1* | 11/2020 | Van der Auwera | H04N 19/42 |
| 2020/0396459 A1 | 12/2020 | Lin et al. | |
| 2020/0404325 A1* | 12/2020 | Ramasubramonian | H04N 19/70 |
| 2020/0413049 A1 | 12/2020 | Biatek et al. | |

OTHER PUBLICATIONS

Pfaff, J. et al., "8-bit implementation and simplification of MIP", Joint Video Experts Team (JVET) of ITU-T SG 16 WP 3 and ISO/IEC JTC 1/SC 29/WG 11, 15th Meeting: Gothenburg, SE (Jul. 3-12, 2019) 7 pages.

Biatek, T. et al., "Non-CE3: MIP low resolution clipping", Joint Video Experts Team (JVET) of ITU-T SG 16 WP 3 and ISO/IEC JTC 1/SC 29/WG 11, 15th Meeting: Gothenburg, SE (Jul. 3-12, 2019) 6 pages.

Chen, J. et al., Algorithm description for Versatile Video Coding and Test Model 5 (VTM 5), Joint Video Experts Team (JVET) of ITU-T SG 16 WP 3 and ISO/IEC JTC 1/SC 29/WG 11, 14th Meeting: Geneva, CH (Mar. 19-27, 2019) 77 pages.

Lin, Z. et al, "CE3-related: MIP with simplified mode index coding", Joint Video Experts Team (JVET) of ITU-T SG 16 WP 3 and ISO/IEC JTC 1/SC 29/WG 11, 15th Meeting: Gothenburg, SE (Jul. 3-12, 2019) 5 pages.

* cited by examiner

METHOD AND APPARATUS FOR INTRA-PREDICTION CODING OF VIDEO DATA

CROSS-REFERENCE TO RELATED APPLICATIONS

This application claims under 35 U.S.C. § 119(a) the benefit of Korean Patent Application No. 10-2019-0082130 filed on Jul. 8, 2019, Korean Patent Application No. 10-2019-0102494 filed on Aug. 21, 2019, Korean Patent Application No. 10-2019-0102495 filed on Aug. 21, 2019, Korean Patent Application No. 10-2019-0123492 filed on Oct. 6, 2019, and Korean Patent Application No. 10-2020-0083979 filed on Jul. 8, 2020, the entire contents of which are incorporated herein by reference.

BACKGROUND

(a) Technical Field

The present disclosure relates to encoding and decoding of video data.

(b) Description of the Related Art

Since the volume of video data typically is larger than that of voice data or still image data, storing or transmitting video data without processing for compression requires a significant amount of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for video include H.264/AVC and High Efficiency Video Coding (HEVC), which improves coding efficiency over H.264/AVC by about 40%.

However, for video data, picture size, resolution, and frame rate are gradually increasing, and accordingly the amount of data to be encoded is also increasing. Accordingly, a new compression technique having better encoding efficiency and higher image quality than the existing compression technique is required.

SUMMARY

The present disclosure discloses improved techniques for intra-prediction coding of a block of video data.

In accordance with one aspect of the present disclosure, a method of decoding video data includes decoding, from a bitstream, a syntax element indicating an intra-prediction type of a current block of the video data, the intra-prediction type including matrix based intra-prediction (MIP) and regular intra-prediction; and generating a prediction block for the current block by selectively performing the MIP or the regular intra-prediction based on the intra-prediction type of the current block indicated by the syntax element.

In generating the prediction block for the current block by performing the MIP, the method further includes decoding, from the bitstream, a syntax element indicating an MIP mode for the current block, the syntax element being represented as a truncated binary code specifying one of a plurality of MIP prediction modes allowed for a width and a height of the current block; deriving an input boundary vector using neighboring samples adjacent to the current block based on the width and the height of the current block; generating predicted samples for the current block based on matrix-vector multiplication between the input boundary vector and a matrix predefined for the MIP mode; and deriving the prediction block for the current block based on the predicted samples.

In generating the prediction block for the current block by performing the regular intra-prediction, the method further includes deriving Most Probable Mode (MPM) candidates based on a regular intra-prediction mode of neighboring blocks adjacent to the current block and configuring an MPM list for the current block; and deriving a regular intra-prediction mode for the current block based on the MPM list. When an intra-prediction type of the neighboring blocks is the MIP, the regular intra-prediction mode of the neighboring block is set (regarded) as a PLANAR mode.

In accordance with another aspect of the present disclosure, an apparatus for decoding video data includes a decoder configured to decode, from a bitstream, a syntax element indicating an intra-prediction type of a current block of the video data, the intra-prediction type including matrix based intra-prediction (MIP) and regular intra-prediction; and an intra-predictor configured to generate a prediction block for the current block by selectively performing the MIP or the regular intra-prediction based on the intra-prediction type of the current block indicated by the syntax element.

In generating the prediction block for the current block by performing the MIP, the intra-predictor is configured to decode, from the bitstream, a syntax element indicating an MIP mode for the current block, the syntax element being represented as a truncated binary code specifying one of a plurality of MIP prediction modes allowed for a width and a height of the current block; derive an input boundary vector using neighboring samples adjacent to the current block based on the width and the height of the current block; generate predicted samples for the current block based on matrix-vector multiplication between the input boundary vector and a matrix predefined for the MIP mode; and derive the prediction block for the current block based on the predicted samples.

In generating the prediction block for the current block by performing the regular intra-prediction, the intra-predictor is configured to derive Most Probable Mode (MPM) candidates based on a regular intra-prediction mode of neighboring blocks adjacent to the current block and configure an MPM list for the current block; and derive a regular intra-prediction mode for the current block based on the MPM list. In deriving the MPM candidates, when an intra-prediction type of the neighboring blocks is the MIP, the intra-predictor sets (regards) the regular intra-prediction mode of the neighboring block as a PLANAR mode.

DETAILED DESCRIPTION

Figure 1:
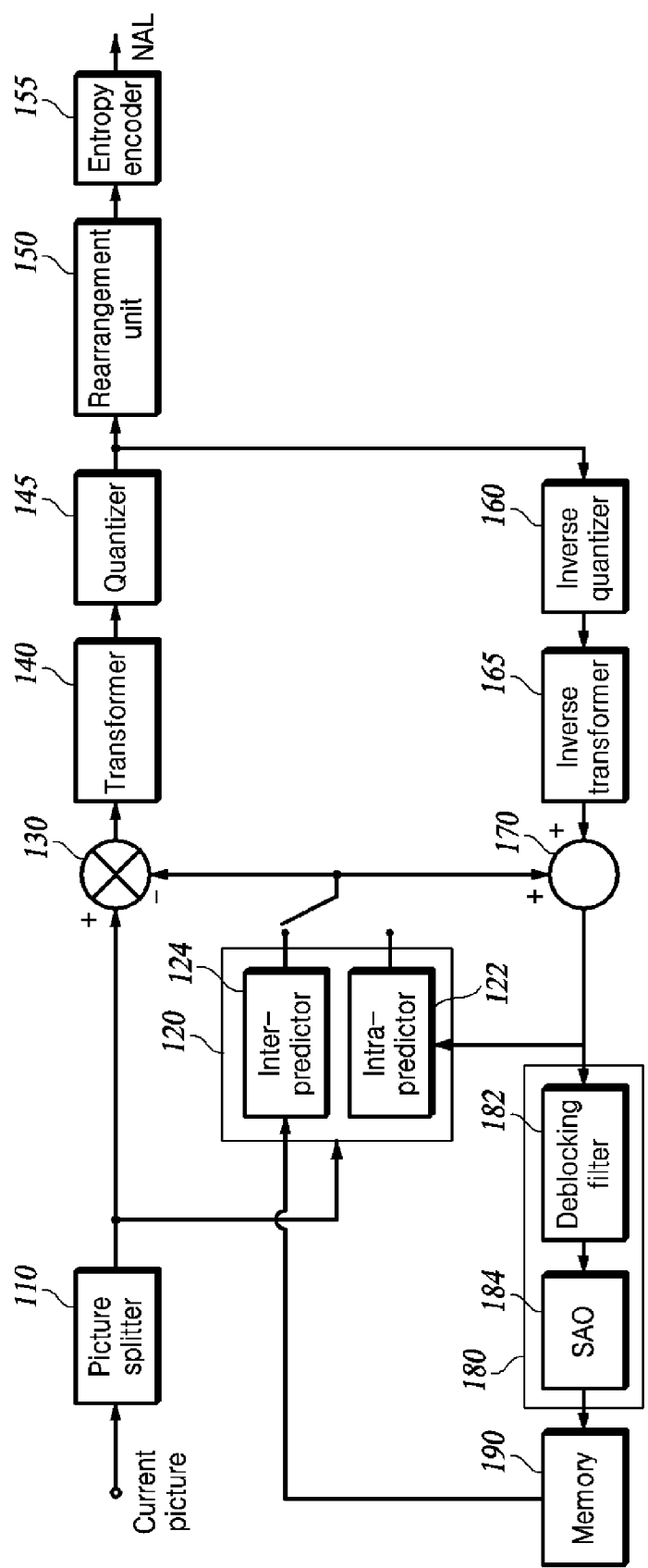
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video includes a plurality of pictures. Each picture is split into a plurality of regions, and encoding is performed on each region. For example, one picture is split into one or more tiles or/and slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting a picture is encoded in a picture parameter set (PPS) or a picture header. Furthermore, information which a plurality of pictures refers to in common is encoded in a sequence parameter set (SPS). In addition, information referred to by one or more SPSs in common is encoded in a video parameter set (VPS). Information applied to one tile or tile group in common may be encoded as a syntax of a tile or tile group header.

The picture splitter 110 is configured to determine the size of a coding tree unit (CTU). Information about the size of the CTU (CTU size) is encoded as a syntax of the SPS or PPS and is transmitted to the video decoding apparatus.

The picture splitter 110 is configured to split each picture constituting the video into a plurality of CTUs having a predetermined size, and then recursively split the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
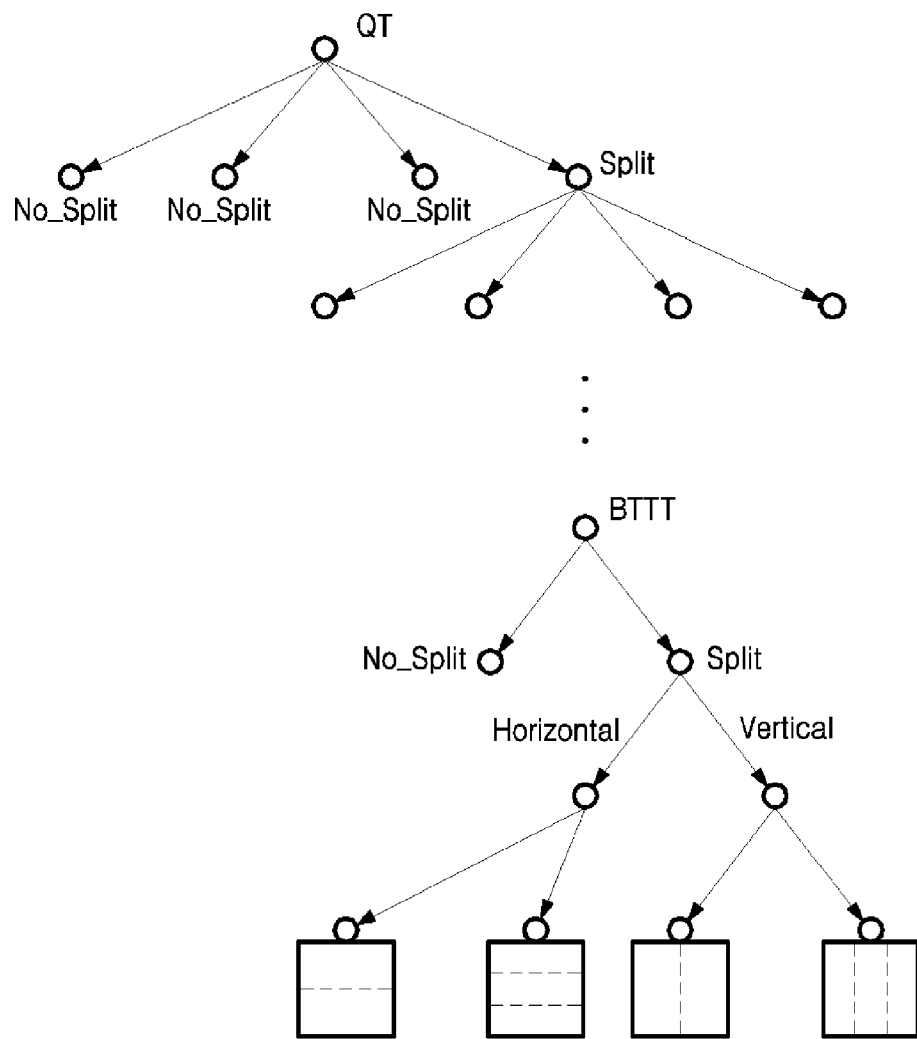
FIG. 2 exemplarily shows a block partitioning structure using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 is configured to predict the current block to generate a prediction block. The predictor 120 includes an intra-predictor 122 and an inter-predictor 124.

In general, each of the current blocks in a picture may be predictively coded. In general, prediction of a current block is performed using an intra-prediction technique (using data from a picture containing the current block) or an inter-prediction technique (using data from a picture coded before a picture containing the current block). The inter-prediction includes both unidirectional prediction and bi-directional prediction.

The intra-prediction unit 122 is configured to predict pixels in the current block using pixels (reference pixels) positioned around the current block in the current picture including the current block. There is a plurality of intra-prediction modes according to the prediction directions. For example, as shown in FIG. 3, the plurality of intra-prediction modes may include two non-directional modes, which include a PLANAR mode and a DC mode, and 65 directional modes. Neighboring pixels and an equation to be used are defined differently for each prediction mode. The table below lists intra-prediction mode numbers and names thereof.

rate distortion values using rate-distortion analysis of several tested intra-prediction modes, and may select an intra-prediction mode that has the best rate distortion characteristics among the tested modes.

The intra-predictor 122 is configured to select one intra-prediction mode from among the plurality of intra-prediction modes, and predicts the current block using neighboring pixels (reference pixels) and an equation determined according to the selected intra-prediction mode. Information about the selected intra-prediction mode is encoded by the entropy encoder 155 and transmitted to the video decoding apparatus.

In addition, the intra-predictor 122 may generate a prediction block for the current block, using matrix-based intra-prediction (MIP), which will be described later. The intra-predictor 122 generates a prediction block for the current block using a boundary vector derived from samples reconstructed on the left side of the current block and samples reconstructed above the current block, a predefined matrix, and an offset vector.

The inter-predictor 124 is configured to generate a prediction block for the current block through motion compensation. The inter-predictor 124 may search for a block most similar to the current block in a reference picture which has been encoded and decoded earlier than the current picture, and generate a prediction block for the current block using the searched block. Then, the inter-predictor is configured to generate a motion vector corresponding to a displacement between the current block in the current picture and the

TABLE 1

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |

Figure 3A:
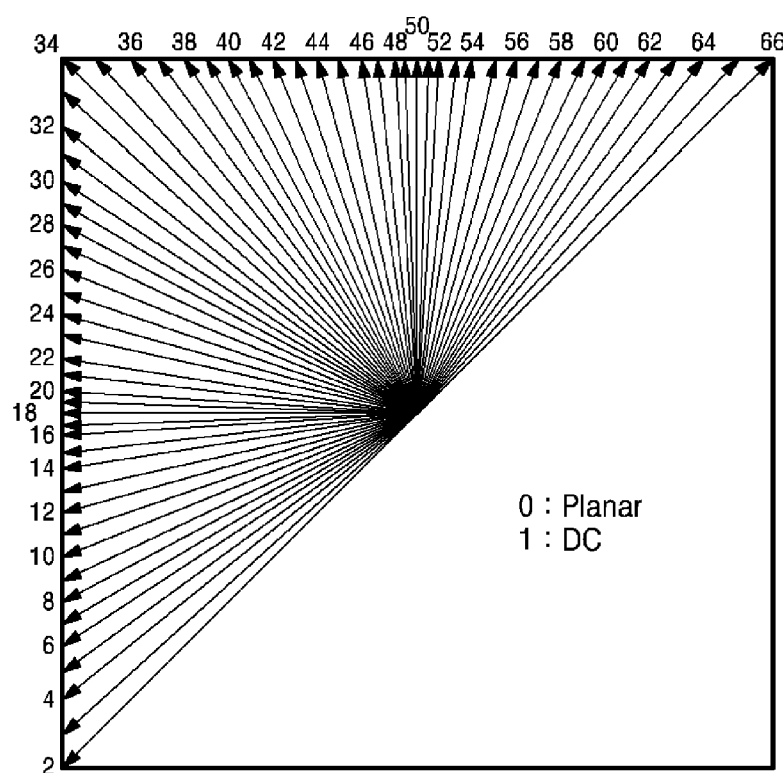
FIG. 3A exemplarily shows a plurality of intra-prediction modes.
Figure 3B:
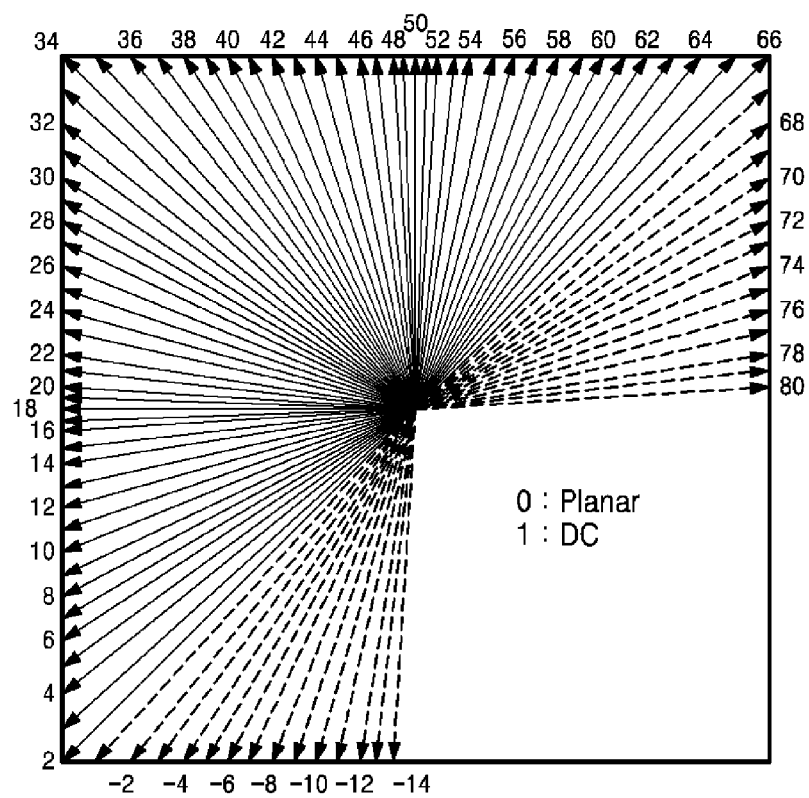
FIG. 3B exemplarily shows a plurality of intra prediction modes including wide-angle intra prediction modes.

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes." In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape. In this case, among the wide angle intra-prediction modes, some wide angle intra-prediction modes available for the current block may be determined based on a ratio of a width and a height of the rectangular current block. For example, wide angle intra-prediction modes with an angle less than 45 degrees (intra prediction modes 67 to 80) may be used when the current block has a rectangular shape with a height less than the width thereof. Wide angle intra-prediction modes with an angle greater than −135 degrees (intra-prediction modes −1 to −14) may be used when the current block has a rectangular shape with the height greater than the width thereof.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The subtractor 130 is configured to subtract the prediction block generated by the intra-predictor 122 or the inter-predictor 124 from the current block to generate a residual block.

The transformer 140 may split the residual block into one or more transform blocks, and applies the transformation to the one or more transform blocks, thereby transforming the residual values of the transform blocks from the pixel domain to the frequency domain. In the frequency domain, the transformed blocks are referred to as coefficient blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may transform residual signals in the residual block using the entire size of the residual block as a transformation unit. In addition, the transformer 140 may partition the residual block into two sub-blocks in a horizontal or vertical direction, and may transform only one of the two sub-blocks. Accordingly, the size of the transform block may be different from the size of the residual block (and thus the size of the prediction block). Non-zero residual sample values may not be present or may be very rare in the untransformed subblock. The residual samples of the untransformed subblock are not signaled, and may be regarded as "0" by the video decoding apparatus. There may be multiple partition types according to the partitioning direction and partitioning ratio. The transformer 140 may provide information about the coding mode (or transform mode) of the residual block (e.g., information indicating whether the residual block is transformed or the residual subblock is transformed, and information indicating the partition type selected to partition the residual block into subblocks, and information identifying a subblock that is transformed is performed) to the entropy encoder 155. The entropy encoder 155 may encode the information about the coding mode (or transform mode) of the residual block.

The quantizer 145 is configured to quantize transform coefficients output from the transformer 140, and output the quantized transform coefficients to the entropy encoder 155. For some blocks or frames, the quantizer 145 may directly quantize a related residual block without transformation.

The rearrangement unit 150 may reorganize the coefficient values for the quantized residual value. The rearrangement unit 150 may change the 2-dimensional array of coefficients into a 1-dimensional coefficient sequence through coefficient scanning. For example, the rearrangement unit 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. That is, a scan mode to be used may be determined among the zig-zag scan, the diagonal scan, the vertical scan and the horizontal scan according to the size of the transformation unit and the intra-prediction mode.

The entropy encoder 155 is configured to encode the one-dimensional quantized transform coefficients output from the rearrangement unit 150 using various encoding techniques such as Context-based Adaptive Binary Arithmetic Code (CABAC) and exponential Golomb, to generate a bitstream.

The entropy encoder 155 may encode information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 may encode information about a prediction type indicating whether the current block is encoded by intra-prediction or inter-prediction, and encode intra-prediction information (i.e., information about an intra-prediction mode) or inter-prediction information (information about a reference picture index and a motion vector) according to the prediction type.

The inverse quantizer 160 is configured to inversely quantize the quantized transform coefficients output from the quantizer 145 to generate transform coefficients. The inverse transformer 165 is configured to transform the transform coefficients output from the inverse quantizer 160 from the frequency domain to the spatial domain and reconstructs the residual block.

The adder 170 is configured to add the reconstructed residual block to the prediction block generated by the predictor 120 to reconstruct the current block. The pixels in the reconstructed current block are used as reference pixels in performing intra-prediction of a next block.

The filter unit 180 is configured to filter the reconstructed pixels to reduce blocking artifacts, ringing artifacts, and blurring artifacts generated due to block-based prediction and transformation/quantization. The filter unit 180 may include a deblocking filter 182 and a pixel adaptive offset (SAO) filter 184.

The deblocking filter 182 is configured to filter the boundary between the reconstructed blocks to remove blocking artifacts caused by block-by-block coding/decoding, and the SAO filter 184 is configured to perform additional filtering on the deblocking-filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture may be used as a reference picture for inter-prediction of blocks in a picture to be encoded next.

Figure 4:
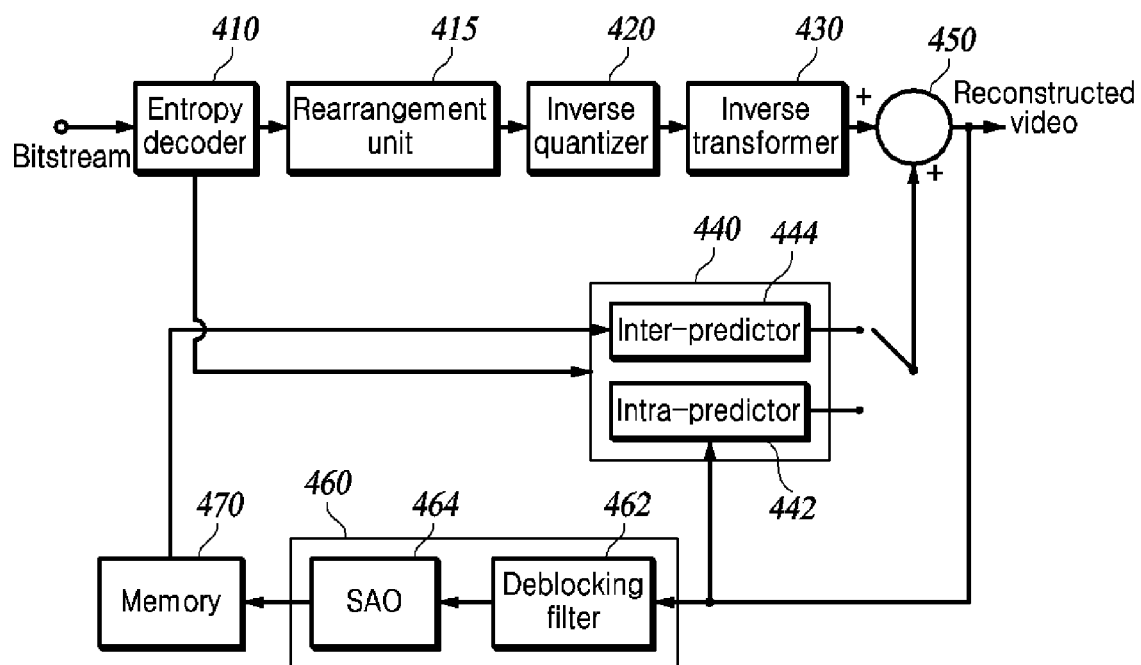
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include an entropy decoder 410, a rearrangement unit 415, an inverse quantizer 420, an inverse transformer 430, a predictor 440, an adder 450, a filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 is configured to determine a current block to be decoded by decoding a bitstream generated by the video encoding apparatus and extracting information related to block splitting, and extract prediction information and information about a residual signal, and the like required to reconstruct the current block.

The entropy decoder 410 is configured to extract information about the CTU size from the sequence parameter set (SPS) or the picture parameter set (PPS), determine the size of the CTU, and split a picture into CTUs of the determined size. Then, the decoder is configured to determine the CTU as the uppermost layer, that is, the root node of a tree structure, and extract splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 is configured to extract information about a prediction type indicating whether the current block is intra-predicted or inter-predicted. When the prediction type information indicates intra-prediction, the entropy decoder 410 is configured to extract a syntax element for the intra-prediction information (intra-prediction mode) for the current block. When the prediction type information indicates inter-prediction, the entropy decoder 410 is configured to extract a syntax element for the inter-prediction information, that is, information indicating a motion vector and a reference picture referred to by the motion vector.

The entropy decoder 410 is configured to extract information about the coding mode of the residual block (e.g., information about whether the residual block is encoded only a subblock of the residual block is encoded, information indicating the partition type selected to partition the residual block into subblocks, information identifying the encoded residual subblock, quantization parameters, etc.) from the bitstream. The entropy decoder 410 also is configured to extract information about quantized transform coefficients of the current block as information about the residual signal.

The rearrangement unit 415 may change the sequence of the one-dimensional quantized transform coefficients entropy-decoded by the entropy decoder 410 to a 2-dimensional coefficient array (i.e., block) in a reverse order of the coefficient scanning performed by the video encoding apparatus.

The inverse quantizer 420 is configured to inversely quantize the quantized transform coefficients. The inverse transformer 430 is configured to inversely transform the inversely quantized transform coefficients from the frequency domain to the spatial domain based on information about the coding mode of the residual block to reconstruct residual signals, thereby generating a reconstructed residual block for the current block When the information about the coding mode of the residual block indicates that the residual block of the current block has been coded by the video encoding apparatus, the inverse transformer 430 uses the size of the current block (and thus the size of the residual block to be reconstructed) as a transform unit for the inverse quantized transform coefficients to perform inverse transform to generate a reconstructed residual block for the current block.

When the information about the coding mode of the residual block indicates that only one subblock of the residual block has been coded by the video encoding apparatus, the inverse transformer 430 uses the size of the transformed subblock as a transform unit for the inverse quantized transform coefficients to perform inverse transform to reconstruct the residual signals for the transformed subblock, and fills the residual signals for the untransformed subblock with a value of "0" to generate a reconstructed residual block for the current block.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 is configured to determine an intra-prediction mode of the current block among a plurality of intra-prediction modes based on the syntax element for the intra-prediction mode extracted from the entropy decoder 410, and predict the current block using the reference pixels around the current block according to the intra-prediction mode. In addition, the intra-predictor 442 may generate a prediction block for the current block, using matrix-based intra-prediction (MIP), which will be described later. The intra-predictor 422 may generate a prediction block for the current block using a boundary vector derived from samples reconstructed on the left side of the current block and samples reconstructed at the above of the current block, and a predefined matrix and offset vector.

The inter-predictor 444 is configured to determine a motion vector of the current block and a reference picture referred to by the motion vector using the syntax element for the intra-prediction mode extracted from the entropy decoder 410, and predict the current block based on the motion vector and the reference picture.

The adder 450 is configured to reconstruct the current block by adding the residual block output from the inverse transformer and the prediction block output from the inter-predictor or the intra-predictor. The pixels in the reconstructed current block are used as reference pixels in intra-predicting a block to be decoded next.

The filter unit 460 may include a deblocking filter 462 and an SAO filter 464. The deblocking filter 462 is configured to deblock-filter the boundary between the reconstructed blocks to remove blocking artifacts caused by block-by-block decoding. The SAO filter 464 can perform additional filtering on the reconstructed block after deblocking filtering to corresponding offsets so as to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next.

The techniques of the present disclosure generally are related to intra-prediction coding. The following description is mainly focused on decoding techniques, that is, the operations of the video decoder. The encoding techniques are briefly described because they are opposite to the decoding techniques that are comprehensively described.

In the discussion of the Next-generation Video Coding standard (i.e., Versatile Video Coding (VVC)), several new coding tools enabling better coding performance than the High Efficiency Video Coding (HEVC) have been introduced.

Unlike HEVC, which can use only a closest reference sample line in intra prediction, VVC can use two additional reference lines, which is known as multiple reference line (MRL) intra prediction. The additional reference lines can be used only for MPM modes, and cannot use non-MPM modes. When the video encoder performs prediction for each of directional modes, the encoder may select one reference line from among the three reference lines based on the RD COST. The index (mrl_idx) of the selected reference line is signaled separately and transmitted to the video decoder.

To predict a rectangular block PU with a width W and a height H, the MIP takes as inputs H reconstructed samples on the left of the block and W reconstructed samples on the above of the block. The final predicted pixels are obtained by averaging, matrix-vector multiplication, linear interpolation, and the like.

The sizes of blocks to which MIP is applied are classified into three categories as follows.

$$idx(W, H) = \begin{cases} 0 & \text{for } W = H = 4 \\ 1 & \text{for } \max(W, H) = 8 \\ 2 & \text{for } \max(W, H) > 8 \end{cases}$$

According to idx(W,H), the number of MIP modes (numModes), boundary size (boundarySize), and prediction block size (predW, predH, predC) are defined as follows. In the table below, MipSizeId=idx(W,H).

TABLE 2

| MipSizeId | numModes | boundarySize | predW | predH | predC |
|---|---|---|---|---|---|
| 0 | 35 | 2 | 4 | 4 | 4 |
| 1 | 19 | 4 | 4 | 4 | 4 |
| 2 | 11 | 4 | Min(nTbW, 8) | Min(nTbH, 8) | 8 |

ISP (Intra Sub-Partitions) is a coding tool that divides a CU into a plurality of subblocks of the same size in a vertical or horizontal direction according to the size thereof, and performs prediction for each subblock in the same intra-prediction mode. The reconstructed sample values of each subblock are available for prediction of the next subblock, which is processed iteratively for each subblock. The minimum block size applicable to the ISP is 4×8 or 8×4. When the size of a block is 4×8 or 8×4, it is partitioned into two subblocks. When the size of a block is larger than this size, it may be partitioned into four subblocks. When the MRL index of the block is not 0, the ISP is not used.

Unlike general in-loop filtering applied directly to reconstructed video images, LMCS (Luma Mapping with Chroma Scaling) adjusts the distribution of codewords for a dynamic range of a video signal to enable efficient prediction and quantization, thereby improving the coding performance and the image quality. LMCS includes luma component mapping and chroma component scaling.

Luma mapping refers to in-loop mapping in which codewords for a dynamic range of an input luma signal is redistributed into codewords capable of improving coding performance. Luma signal mapping may be performed through forward mapping and backward mapping corresponding thereto. Forward mapping divides the existing dynamic range into 16 equal sections, and then redistributes the codeword of the input video through a linear model for each section. Chroma scaling modifies a chroma signal according to a correlation between a luma signal and a corresponding chroma signal.

Matrix-based Intra-prediction (MIP) is a new intra-prediction technique introduced in VTM 5.0. The original idea is to use a neural network-based intra-prediction technique, that is, to use a multilayer neural network to predict current PU pixel values based on adjacent reconstructed pixels. However, due to the high complexity of the prediction method using the neural network, an intra-prediction technique based on affine linear transform using pre-trained matrices has been introduced.

Figure 5:
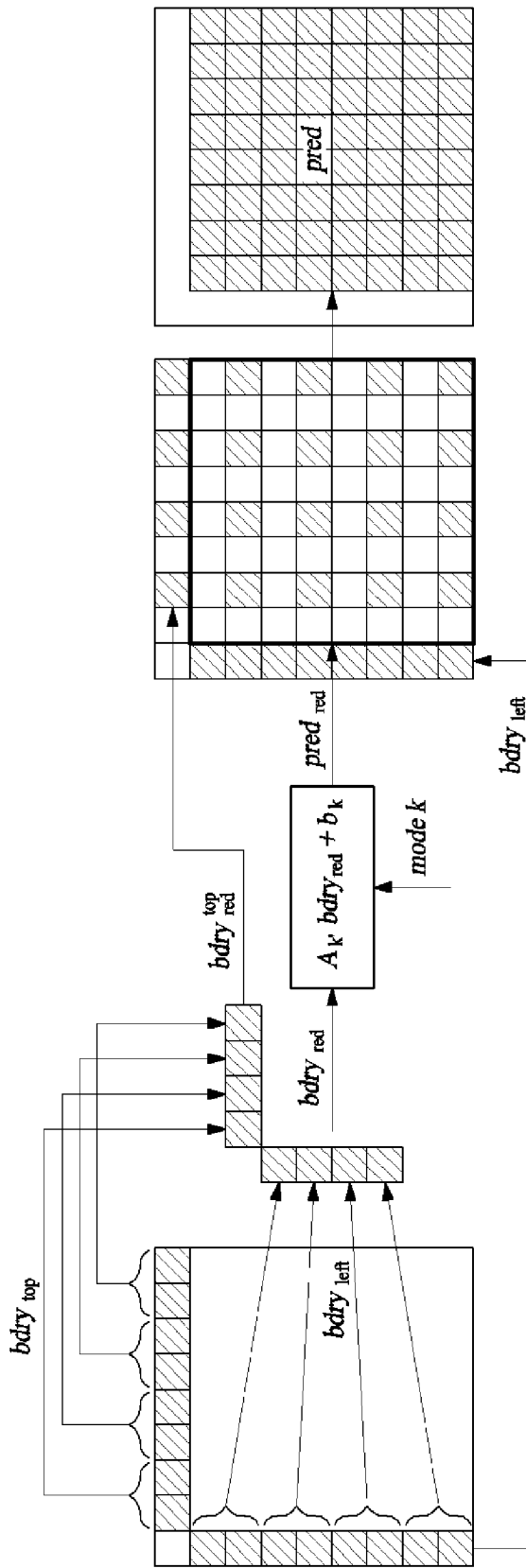
FIG. 5 is a conceptual diagram illustrating the main process of MIP technology that may be used in the techniques of the present disclosure.

FIG. 5 is a conceptual diagram illustrating the main processes of MIP technology that may be used in the techniques of the present disclosure.

(1) Averaging

The main purpose of this process is to normalize the reference samples. Depending on the block size and shape (width and height) (i.e., MipSizeId), 4 or 8 samples are obtained. When both the width and height of the current block are 4 (i.e., W=H=4), 4 samples in total, including 2 from the left and 2 from the above, are obtained (boundarySize=2). In the other case, 8 samples in total, including 4 from the left and 4 from the above, are obtained (boundarySize=4).

As shown in FIG. 5, the above neighboring samples are denoted by $bdry^{top}$ and the left neighboring samples are denoted by $bdry^{left}$. By performing the averaging on $bdry^{top}$ and $bdry^{left}$, respectively, down-sampled sample sets $bdry_{red}^{top}$ and $bdry_{red}^{left}$ are obtained. The averaging is a downsampling process as follows.

$$redS[x] = (\Sigma_{i=0}^{bDwn-1} refS[x*bDwn+i] + (1 << (\text{Log } 2(bDwn)-1))) >> \text{Log } 2(bDwn)$$

In the equation above, bDwn denotes a downsampling scale value (nTbs/boundarySize), and refS denotes an original reference sample. The calculated redS is stored as $bdry_{red}^{left}$ for the left neighbors and as $bdry_{red}^{top}$ for the above neighbors.

The down-sampled reference samples are stitched into a vector of length 4 or 8. The reduced boundary vector $bdry_{red}$ which is input to the vector-matrix multiplication is defined as the equation below. For example, when W=H=4 and the MIP mode is less than 18, the boundary vector is constructed by stitching in order of $bdry_{red}^{left}$ and $bdry_{red}^{top}$. When W=H=4 and the MIP mode is greater than or equal to 18, they are stitched in order of $bdry_{red}^{left}$ and $bdry_{red}^{top}$. In the following equation, "mode" denotes the MIP mode.

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{top}] & \text{for } \max(W, H) > 8 \text{ and mode} \geq 6 \end{cases}$$

(2) Matrix-Vector Multiplication

In this process, a down-sampled prediction signal $pred_{red}$ of the current block is generated from the reduced boundary vector. $pred_{red}$ is the sum of the matrix-vector product and the offset and may be calculated as follows.

$$pred_{red} = A \cdot bdry_{red} + b$$

The size of $pred_{red}$ is $W_{red} \times H_{red}$. $W_{red}$ and $H_{red}$ are defined according to the size and shape of the current block as shown below. Matrix A has rows as many as $W_{red} * H_{red}$, and has 4 columns when W=H=4 or 8 columns in the other cases. The offset vector b is a vector of size $W_{red} * H_{red}$.

$$W_{red} = \begin{cases} 4 & \text{for } \max(W, H) \leq 8 \\ \min(W, 8) & \text{for } \max(W, H) > 8 \end{cases}$$

$$H_{red} = \begin{cases} 4 & \text{for } \max(W, H) \leq 8 \\ \min(H, 8) & \text{for } \max(W, H) > 8 \end{cases}$$

Sets $S_0$, $S_1$, and $S_2$ of the matrix A and the offset vector b that may be used for the coding block are predefined for each category of coding block sizes. The indices (0, 1, 2) of the set S are selected according to the aforementioned MipSizeId (i.e., idx(W,H)), and the matrix A and the offset vector b are extracted from one of the sets $S_0$, $S_1$, and $S_2$ according to the MIP mode applied to the current block.

The set $S_0$ consists of 18 matrices $A_0$ each having 16 rows and 4 columns, and 18 16-dimensional offset vectors $b_0$, and is used for a 4×4 block. The set $S_1$ consists of 10 matrices $A_1$ each having 16 rows and 8 columns and 10 16-dimensional offset vectors $b_1$, and is used for blocks of 4×8, 8×4 and 8×8 sizes. Finally, the set $S_2$ consists of 6 matrices $A_2$ each having 64 rows and 8 columns and 6 64-dimensional offset vectors $b_2$, and is used for all other block shapes.

(3) Pixel Interpolation

Interpolation is an upsampling process. As mentioned above, $pred_{red}$ is a down-sampled prediction signal of the original block. In this case, a down-sampled prediction block with a size of predW and predH is defined as follows.

$pred_{red}[x][y]$, with $x=0 \ldots predW1, y=0 \ldots predH-1$

A prediction block having an original block size (nTbW, nTbH) generated by linearly interpolating the prediction signal at the remaining position in each direction is defined as follows.

predSamples[x][y], with $x=0 \ldots nTbW-1, y=0 \ldots nTbH-1$

Depending on the horizontal and vertical upsampling scale factors upHor(=nTbW/predW) and upVer (=nTbH/predH), some or all of the predSamples are filled from $pred_{red}$ as follows.

predSamples[(x+1)*upHor-1][(y+1)*upVer-1]=$pred_{red}$[x][y]

When upHor=1, all horizontal positions of predSamples from $pred_{red}$ are filled. When upVer=1, all vertical positions of predSamples from $pred_{red}$ are filled.

Thereafter, the remaining empty samples of predSamples are filled through bi-linear interpolation. Interpolation in the horizontal direction and interpolation in the vertical direction are upsampling processes. For interpolation of left and top samples in predSamples, down-sampled samples $bdry_{red}^{top}$ are assigned to values of predSamples[x][-1], and original reference samples on the left are assigned to values of predSamples[-1][y]. The interpolation order is determined according to the size of the current block. That is, interpolation is first performed in the direction of the short size. Subsequently, interpolation is performed in the direction of the long size.

(4) Signaling of MIP Intra-Prediction Mode

For each coding unit (CU) subjected to intra-prediction coding, a flag indicating whether a matrix-based intra-prediction mode (i.e., MIP mode) is applied is transmitted. In VVC draft 5, for signaling the MIP mode, an MPM list consisting of 3 MPMs is used similarly to the traditional intra-prediction mode (hereinafter, "normal intra-prediction mode") which is different from the matrix-based intra-prediction. For example, intra_mip_mpm_flag, intra_mip_mpm_idx, and intra_mip_mpm_remainder are used for MIP mode signaling. intra_mip_mpm_idx is coded with a truncated binary code, and intra_mip_mpm_remainder is coded with a fixed length code.

Depending on the size of the coding block (CU), up to 35 MIP modes may be supported. For example, for a CU with max (W, H)<=8 and W*H<32, 35 modes are available. In addition, 19 prediction modes and 11 prediction modes are used for CUs with max(W, H)=8 and max(W, H)>8, respectively. In addition, a pair of modes (two modes) may share a matrix and offset vector to reduce memory requirements. The specific sharing mode is calculated as follows. For example, for a 4×4 coding block, mode 19 uses a transposed matrix of the matrix assigned to mode 2.

$$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for } \max(W, H) = 8 \text{ and mode} < 10 \\ \text{mode} - 9 & \text{for } \max(W, H) = 8 \text{ and mode} \geq 10 \\ \text{mode} & \text{for } \max(W, H) > 8 \text{ and mode} < 6 \\ \text{mode} - 5 & \text{for } \max(W, H) > 8 \text{ and mode} \geq 6 \end{cases}$$

When there is a block to which MIP is applied adjacent to a block to which a regular intra-prediction mode other than MIP is applied (hereinafter referred to as a "regular block"), a mapping table defined between the MIP mode and the regular mode may be used for MPM derivation of the regular block. The mapping table is used to derive a regular mode of similar characteristics from the MIP mode of the neighboring block to which the MIP is applied. The regular mode derived in this way is used for MPM derivation of the regular block. Similarly, even when MIP is applied to a collocated luma block used in chroma DM derivation, a regular mode of the collocated luma block is derived using the mapping table and the derived regular mode is used for chroma DM derivation. The equation below expresses the mapping between the regular modes and the MIP modes using the mapping tables of Tables 3 and 4.

$predmode_{MIP}$=map_regular_to_mip$_{idx}$
[$predmode_{regular}$]

$predmode_{regular}$=map_mip_to_regular$_{idx}$[$predmode_{MIP}$]

TABLE 3

| IntraPredModeY[xNbX][yNbX] | MipSizeId 0 | MipSizeId 1 | MipSizeId 2 |
|---|---|---|---|
| 0 | 17 | 0 | 5 |
| 1 | 17 | 0 | 1 |
| 2, 3 | 17 | 10 | 3 |
| 4, 5 | 9 | 10 | 3 |
| 6, 7 | 9 | 10 | 3 |
| 8, 9 | 9 | 10 | 3 |
| 10, 11 | 9 | 10 | 0 |
| 12, 13 | 17 | 4 | 0 |
| 14, 15 | 17 | 6 | 0 |
| 16, 17 | 17 | 7 | 4 |
| 18, 19 | 17 | 7 | 4 |
| 20, 21 | 17 | 7 | 4 |
| 22, 23 | 17 | 5 | 5 |
| 24, 25 | 17 | 5 | 1 |
| 26, 27 | 5 | 0 | 1 |
| 28, 29 | 5 | 0 | 1 |
| 30, 31 | 5 | 3 | 1 |
| 32, 33 | 5 | 3 | 1 |
| 34, 35 | 34 | 12 | 6 |
| 36, 37 | 22 | 12 | 6 |
| 38, 39 | 22 | 12 | 6 |
| 40, 41 | 22 | 12 | 6 |
| 42, 43 | 22 | 14 | 6 |
| 44, 45 | 34 | 14 | 10 |
| 46, 47 | 34 | 14 | 10 |
| 48, 49 | 34 | 16 | 9 |
| 50, 51 | 34 | 16 | 9 |
| 52, 53 | 34 | 16 | 9 |
| 54, 55 | 34 | 15 | 9 |
| 56, 57 | 34 | 13 | 9 |
| 58, 59 | 26 | 1 | 8 |
| 60, 61 | 26 | 1 | 8 |
| 62, 63 | 26 | 1 | 8 |
| 64, 65 | 26 | 1 | 8 |
| 66 | 26 | 1 | 8 |

TABLE 4

| IntraPredModeY[xNbX][yNbX] | MipSizeId 0 | MipSizeId 1 | MipSizeId 2 |
|---|---|---|---|
| 0 | 0 | 0 | 1 |
| 1 | 18 | 1 | 1 |
| 2 | 18 | 0 | 1 |
| 3 | 0 | 1 | 1 |
| 4 | 18 | 0 | 18 |
| 5 | 0 | 22 | 0 |
| 6 | 12 | 18 | 1 |
| 7 | 0 | 18 | 0 |
| 8 | 18 | 1 | 1 |
| 9 | 2 | 0 | 50 |
| 10 | 18 | 1 | 0 |
| 11 | 12 | 0 | |
| 12 | 18 | 1 | |
| 13 | 18 | 0 | |
| 14 | 1 | 44 | |
| 15 | 18 | 0 | |
| 16 | 18 | 50 | |
| 17 | 0 | 1 | |
| 18 | 0 | 0 | |
| 19 | 50 | | |
| 20 | 0 | | |
| 21 | 50 | | |
| 22 | 0 | | |
| 23 | 56 | | |
| 24 | 0 | | |
| 25 | 50 | | |
| 26 | 66 | | |
| 27 | 50 | | |
| 28 | 56 | | |
| 29 | 50 | | |
| 30 | 50 | | |
| 31 | 1 | | |
| 32 | 50 | | |
| 33 | 50 | | |
| 34 | 50 | | |

As described above, in VVC draft 5, when a block is predicted based on MIP, reconstructed neighboring samples on the left side of the block and reconstructed neighboring samples on the above of the block are always used as reference samples. This approach may deteriorate prediction performance in the case of a block in which the texture of the block has directional characteristics. In addition, in VVC draft 5, for interpolation of top samples in predSamples, the down-sampled sample set is allocated to values of predSamples[x][−1] as shown in FIG. 5, thereby making the interpolation process more complex than necessary. Furthermore, in VVC draft 5, as each MPM list is employed for signaling of the MIP mode and the regular mode, the implementation may be very complicated due to many checks and conditions such as a requirement for mapping between the MIP mode and the regular mode.

In view of the above, the present disclosure proposes several improved techniques capable of reducing the implementation complexity of the MIP mode and improving prediction performance.

Use of Smoothing Filtered Reference Sample

Figure 6:
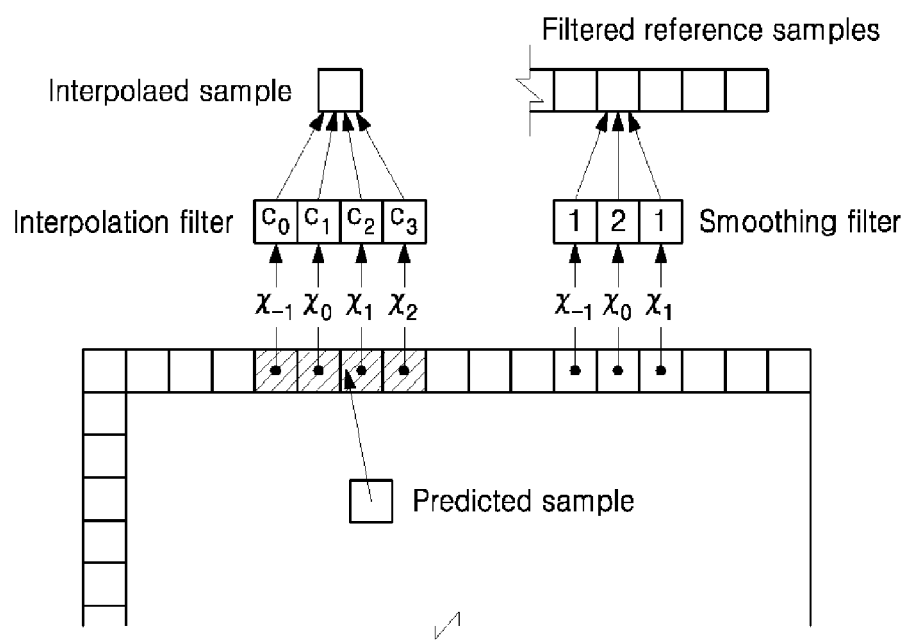
FIG. 6 illustrates smoothing filtering and interpolation filtering for constructing reference samples.

In typical intra-prediction coding, a smoothing filter, a Gaussian interpolation filter, and a cubic interpolation filter may be selectively used to obtain reference samples for directional modes. FIG. 6 illustrates smoothing filtering and interpolation filtering. In the reference sample filtering process, intra-prediction modes are classified into three groups. Group A is composed of horizontal and vertical prediction modes, Group B is composed of diagonal modes that are multiples of 45 degrees, and Group C is composed of other directional modes. No filter is applied for group A. The diagonal modes belonging to group B refer to a pixel at an integer position, and therefore there is no need to apply the interpolation filter, and only a [1, 2, 1]/4 smoothing filter is applied to the reference samples. For group C, the [1, 2, 1]/4 smoothing filter is not applied, but a 4-tap Gaussian interpolation filter or a 4-tap cubic interpolation filter is applied according to conditions to obtain reference samples at decimal positions.

Smoothing filtering for reference samples may be performed as follows. Hereinafter, a reference sample prior to filtering is indicated as refUnfilt[x][y], and a reference sample after filtering is indicated as refFilt[x][y]. Here, the [1, 2, 1]/4 smoothing filter is used for filtering. refH and refW are the number of left reference samples and the number of above reference samples, respectively.

Filtering of the above left corner reference sample refFilt[−1][−1]=(refUnfilt[−1][0]+2*refUnfilt[−1][−1]+refUnfilt[0][−1]+2)>>2

Filtering of the left reference sample refFilt[−1][y]=refUnfilt[−1][y+1]+2*refUnfilt[−1][y]+refUnfilt[−1][y−1]+2)>>2 {for y=0 . . . refH−2} refFilt[−1][refH−1]=refUnfilt[−1][refH−1]

Filtering of the above reference sample refFilt[x][−1]=(refUnfilt[x−1][−1]+2*refUnfilt[x][−1]+refUnfilt[x+1][−1]+2)>>2 {for x=0 . . . refW−2} refFilt[refW−1][−1]=refUnfilt[refW−1][−1]

As shown in the equations above, filtering may be performed between adjacent reference samples located on the same reference line. However, filtering may also be performed between reference samples located on different reference lines. For example, a filtered reference sample may be obtained by calculating the average of two samples located at MRL indexes 0 and 1.

As described above, when MIP is used, boundary samples of an adjacent decoded block located at the above and the left of the coding block may constitute reference samples. In this case, the boundary samples on which no filtering has been performed are used as reference samples. Considering that the MIP mode is often used for predicting and reconstructing low frequency components, it may be advantageous to use sample values from which high frequency components are removed by filtering the reference samples in the MIP prediction process.

In accordance with an aspect of the present disclosure, as in the directional modes of regular intra-prediction, reference samples may be filtered and then used in the MIP mode. The filtered reference samples and unfiltered reference samples may be adaptively used according to the prediction mode of a block, the size of the block, and the MIP mode type.

Filtering for reference samples may be performed when all the following conditions are true. Therefore, if any of the following conditions is not satisfied, the values of refUnfil are copied to refFilt without filtering. In some cases, when the Intra Subpartition (ISP) is applied to the coding block, if the width or height of the partitioned subblock is greater than or equal to 16, filtering may be performed on the boundary of the corresponding sides.

The MRL index is 0.
The product of nTbW and nTbH is greater than 32.
CIdx is 0 (i.e., it is a luma sample).
IntraSubPartitionsSplitType is ISP_NO_SPLIT (i.e., ISP is not applied).
RefFilterFlag is 1 (i.e., the intra-prediction mode is one of 0, 14, 12, 10, 6, 2, 34, 66, 72, 76, 78, 80, or one of the MIP modes).

Whether to adaptively perform filtering of reference pixels may be determined according to the size of a block to which MIP is applied. As described above, the sizes of blocks to which MIP is applied are classified into three categories, and whether to filter the reference pixel may be determined depending on idx(W,H). For example, refUnfilt may be used when Idx is less than 2 (i.e., blocks having a size of 4×4, 4×8, or 8×4), and refFilt may be used when Idx is 2, or vice versa. As another example, refUnfilt is used when Idx is less than 1, and refFilt is used when Idx is greater than or equal to 1, or vice versa. As another example, refUnFilt may be used when the size of the block is 4×4, 4×8, or 8×4, and refFilt may be used otherwise, or vice versa. As another example, refFilt may not be used when either the width or the height of the block is equal to 4. As another example, refFilt may not be used when any one of the width and height of the block is equal to 4.

Whether to adaptively perform filtering of the reference pixel may be determined according to the shape of a block to which MIP is applied. For example, refFilt may be used only when the width and height of the coding block are the same. As another example, refFilt may be used only when the width and height of the coding block are different. As another example, the width and height of a coding block may be compared, refFilt may be used only for the boundary of a block for a longer side. Alternatively, refFilt may be used only for the boundary of a block whose length is short. As another example, refFilt may be used only for the boundary of a side that is greater than or equal to 16 (or 32) of the width or height of a block.

In some embodiments, reference sample sets $bdry^{left}$ and $bdry^{top}$ around a MIP-coded block may be configured as follows. For example, the reference sample sets may be configured from luma samples mapped after LMCS (Luma Mapping with Chroma Scaling) around the MIP-coded block, or may be configured from luma samples mapped before LMCS around the MIP-coded block. As another example, the reference sample sets may be configured from luma samples of neighboring blocks before performing block boundary filtering for regular intra-prediction, or may be configured from luma samples of the neighboring blocks after block boundary filtering. As another example, the reference sample sets may be configured through the same process as used to perform regular intra-prediction around the MIP-coded block.

Generation of an Input Boundary Vector

As described above, in predicting a coding block based on MIP, reconstructed neighboring samples $bdry^{left}$ at the left of the coding block and reconstructed neighboring samples $bdry^{top}$ at the above of the coding block may be used. However, this method may deteriorate prediction performance in the case of a coding block whose texture has directional characteristic.

Accordingly, it may be advantageous to selectively use a neighboring sample set to be used to generate an input boundary vector between $bdry^{left}$ and $bdry^{top}$ so as to reflect the directional characteristic that the texture of the block may have. For example, when pixels of a current coding block are horizontal characteristic, a prediction signal may be generated using left neighboring samples. Similarly, when pixels of the current coding block are vertical characteristic, a prediction signal may be generated using above neighboring samples. The neighboring sample set to be used to generate the input boundary vector may be determined differently according to the MIP mode applied to the coding block.

Hereinafter, for simplicity, several methods of determining a boundary vector and determining predicted samples from the boundary vector will be described for a case of using left neighboring samples and a case of using above neighboring samples.

A. Constructing a Boundary Vector Using Left Neighboring Samples

Figure 7A:
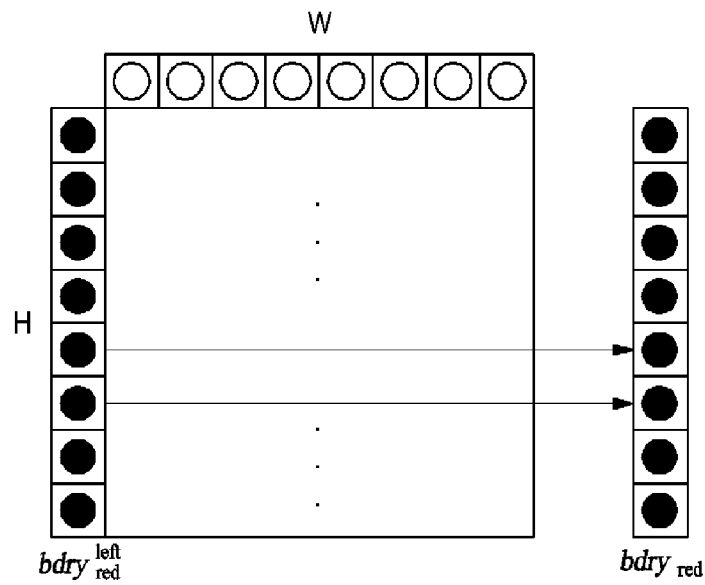
FIGS. 7A to 7C are conceptual diagrams illustrating an exemplary method of constructing a boundary vector that is input to matrix-vector multiplication using left neighboring samples.
Figure 7B:
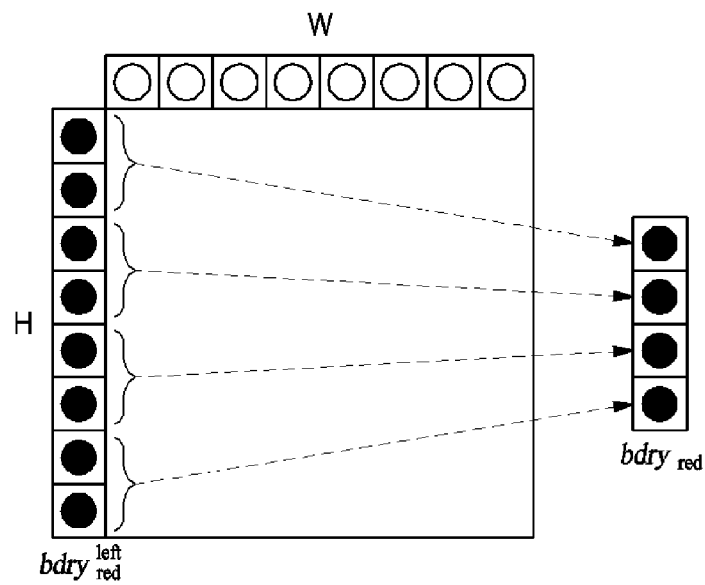
Figure 7C:
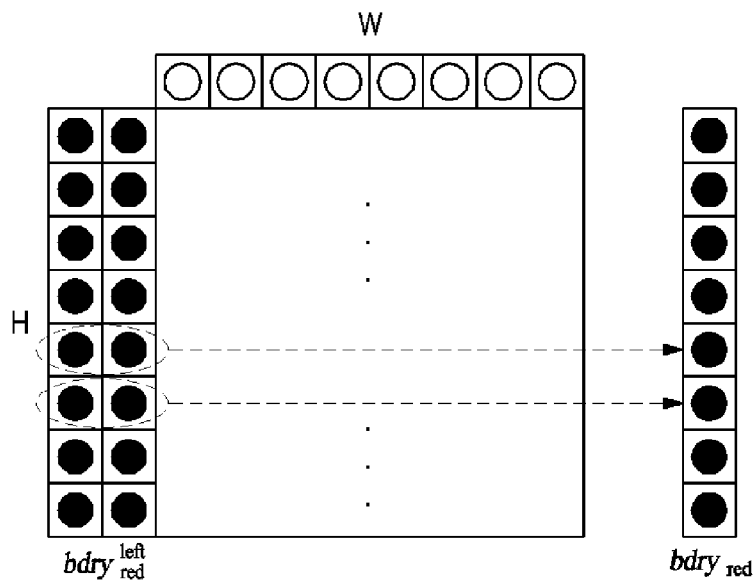

FIGS. 7A to 7C are conceptual diagrams illustrating an exemplary method of constructing a boundary vector to be input to matrix-vector multiplication, using left neighboring samples.

As an example, as illustrated in FIG. 7A, when the size (height) of the current coding block is the same as the size of the boundary vector $bdry_{red}$, the boundary vector $bdry_{red}$ of the same size may be filled using the left neighboring sample set $bdry^{left}$. For example, each of the left neighboring samples may be included in the entry of the boundary vector.

As another example, as illustrated in FIG. 7B, the boundary vector $bdry_{red}$ may be filled using a down-sampled sample set $bdry_{red}^{left}$ obtained from the left neighboring sample set bdry$^{left}$. For example, bdry$_{red}^{left}$ may be obtained by averaging bdry$^{left}$ for every two samples.

As still another example, as illustrated in FIG. 7C, the boundary vector bdry$_{red}$ may be filled by calculating an average of two pixels of each row using two left columns adjacent to the coding block.

Depending on the size of the coding block, bdry$^{left}$ and bdry$_{red}^{left}$ may be used adaptively. For example, as shown in the equation below, when H<=8, bdry$^{left}$ is used. Otherwise, bdry$_{red}^{left}$ may be used.

$$bdry_{red} = \begin{cases} [bdry^{left}] & \text{for } H <= 8 \\ [bdry_{red}^{left}] & \text{otherwise} \end{cases}$$

In some embodiments, in generating a down-sampled sample set bdry$_{red}^{left}$ from bdry$^{left}$, down-sampling may be performed in a different manner according to characteristics of video content. As in screen content coding (SCC), video content may have the same pixel values or intensity values in a specific region, or may have pixel values or intensity values that gradually increases/decreases. In this case, it may be useful to reduce downsampling complexity to generate the down-sampled sample set bdry$_{red}^{left}$ by sampling only the entries corresponding to the even positions (or odd positions) of bdry$^{left}$, rather than generating the down-sampled sample set bdry$_{red}^{left}$ from bdry$^{left}$ by the averaging operation.

For example, as shown in the equation below, when bdry$^{left}$ has H entries from [0] to [H−1] and bdry$_{red}^{left}$ having the size of H/2 is generated therefrom, bdry$^{left}$ may be used if H≤8. Otherwise, bdry$_{red}^{left}$ may be generated by taking entries corresponding to even positions including 0.

$$bdry_{red}^{left}(i) = \begin{cases} [bdry^{left}(i)] & \text{for } H <= 8 \\ [bdry^{left}(i*2)] & \text{otherwise} \end{cases}$$

Furthermore, downsampling complexity may be further lowered by filling all entries of bdry$_{red}^{left}$ with the entry value at the first position in bdry$^{left}$.

bdry$_{red}^{left}$(i)=bdry$^{left}$(0)

These simplified downsamplings and the downsampling through the averaging operation may be selected depending on the characteristics of the video content. For example, when intra-block copy (IBC), which is a coding tool suitable for screen content coding, is applied to a coding block positioned on the left of the MIP-coded current block, simplified downsampling taking entries corresponding to even-numbered positions (or odd-numbered positions) may be used for the coding block. As another example, when a transform skip mode, which is frequently used in screen content coding, is applied to a coding block positioned on the left of the MIP-coded current block, simple downsampling taking entries corresponding to even-numbered positions (or odd-numbered positions) may be used for the coding block. As another example, downsampling through the averaging operation may be completely replaced by simplified downsampling taking entries corresponding to even positions (or odd positions).

B. Boundary Vector Construction Using Above Neighboring Samples

Figure 8A:
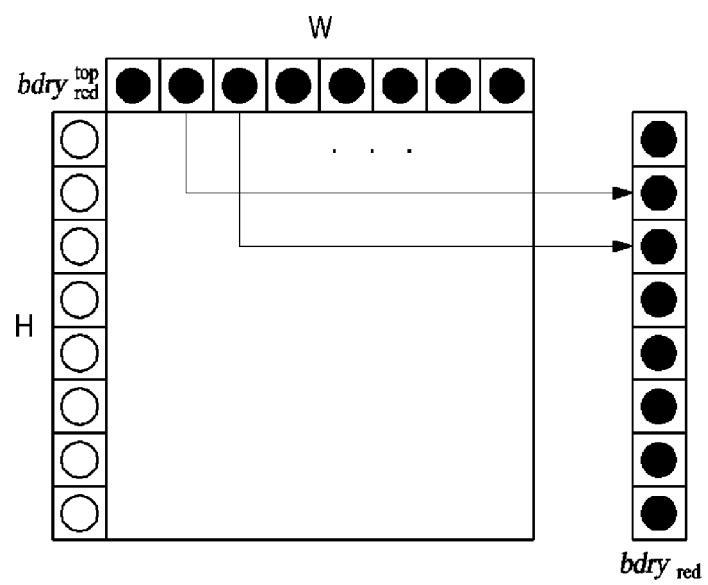
FIGS. 8A to 8C are conceptual diagrams illustrating an exemplary method of constructing a boundary vector that is input to a matrix-vector multiplication operation using above neighboring samples.
Figure 8B:
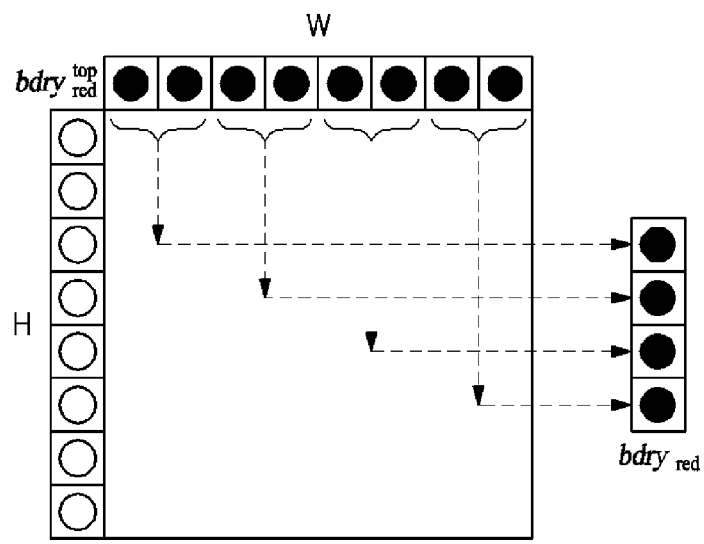
Figure 8C:
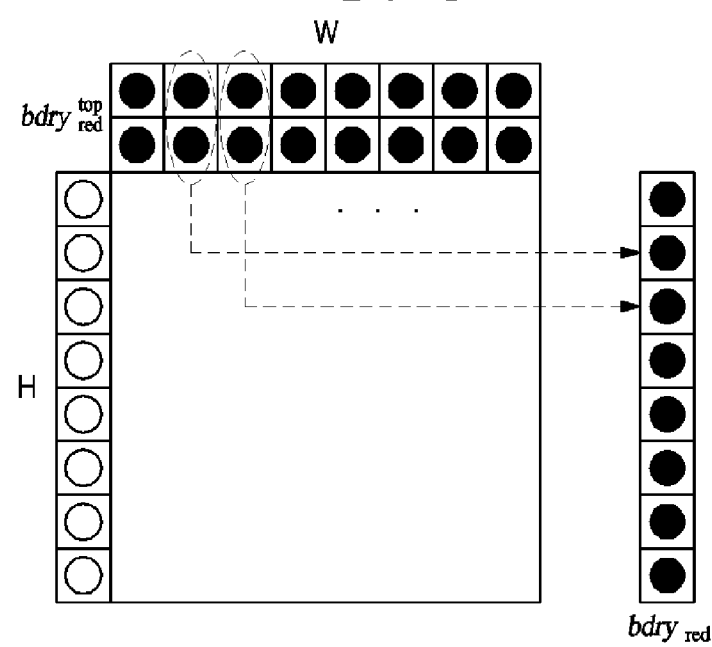

FIGS. 8A to 8C are conceptual diagrams illustrating an exemplary method of constructing a boundary vector to be input to a matrix-vector multiplication operation, using above neighboring samples.

As an example, as illustrated in FIG. 8A, when the size (width) of the current coding block is the same as the size of the boundary vector bdry$_{red}$ bdry$_{red}$, the boundary vector bdry$_{red}$ of the same size may be filled using a above neighboring sample set. For example, each of the above neighboring samples may be included in the entry of the boundary vector.

As another example, as illustrated in FIG. 8B, the boundary vector bdry$_{red}$ may be filled using a down-sampled sample set bdry$_{red}^{top}$ obtained from the above neighboring sample set bdry$^{top}$. For example, bdry$_{red}^{top}$ may be obtained by averaging bdry$^{top}$ for every two samples.

As another example, as illustrated in FIG. 8C, the boundary vector bdry$_{red}$ may be filled by calculating an average of two pixels in each column using two above rows adjacent to the coding block.

Depending on the size of the coding block, bdry$^{top}$ and bdry$_{red}^{top}$ may be used adaptively. For example, as shown in the equation below, when W<=8, bdry$^{top}$ may be used. Otherwise, bdry$_{red}^{top}$ may be used.

$$bdry_{red} = \begin{cases} [bdry^{top}] & \text{for } W <= 8 \\ [bdry_{red}^{top}] & \text{otherwise} \end{cases}$$

As described above, it is useful in reducing downsampling complexity to generate the down-sampled sample set bdry$_{red}^{top}$ by sampling only the entries corresponding to the even positions (or odd positions) of bdry$^{top}$, rather than generating the down-sampled sample set bdry$_{red}^{top}$ from bdry$^{top}$ through the averaging operation.

For example, as shown in the equation below, when bdry$^{top}$ has W entries from [0] to [W−1], and bdry$_{red}^{top}$ having a size of W/2 is generated therefrom, bdry$^{top}$ may be used if W≤8. Otherwise, bdry$_{red}^{top}$ may be generated by taking entries corresponding to even positions including 0.

$$bdry_{red}^{top}(i) = \begin{cases} [bdry^{top}(i)] & \text{for } W <= 8 \\ [bdry^{top}(i*2)] & \text{otherwise} \end{cases}$$

Furthermore, downsampling complexity may be further lowered by filling all entries of bdry$_{red}^{top}$ with the entry value at the first position in bdry$^{top}$.

bdry$_{red}^{top}$(i)=bdry$^{top}$(0)

These simplified downsamplings and the downsampling through the averaging operation may be selected depending on the characteristics of the video content. For example, when intra-block copy (IBC), which is a coding tool suitable for screen content coding, is applied to a coding block positioned on the left (or above) of the MIP-coded current block, simplified downsampling taking entries corresponding to even-numbered positions (or odd-numbered positions) may be used for the coding block. As another example, when a transform skip mode, which is frequently used in screen content coding, is applied to a coding block positioned on the left (or above) of the MIP-coded current block, simplified downsampling taking entries corresponding to even-numbered positions (or odd-numbered positions) may be used for the coding block. As another example, downsampling through the averaging operation may be completely replaced by simple downsampling taking entries corresponding to even-numbered positions (or odd-numbered positions).

Matrix-Vector Multiplication

According to the MIP technique described in VVC draft 5, a boundary vector bdry$_{red}$ of length 4 or 8 is obtained from the left neighboring sample set and the above neighboring sample set. The boundary vector bdry$_{red}$ is input to the vector-matrix multiplication operation. Rather than applying the vector-matrix multiplication directly to the boundary vector bdry$_{red}$, it may be more advantageous in terms of computational and hardware complexity to remove the DC component from the boundary vector bdry$_{red}$ prior to applying the vector-matrix multiplication, and add a DC component after applying the vector-matrix multiplication. According to this method, all entries of a weight matrix used for the vector-matrix multiplication may be expressed as unsigned integers. That is, it may be advantageous to make the average of the entries included in the boundary vector bdry$_{red}$ zero or to convert the same to a value close to zero before applying the vector-matrix multiplication to the boundary vector bdry$_{red}$.

As an example, before applying the vector-matrix multiplication, one pixel value belonging to bdry$_{red}$ may be subtracted from each entry of bdry$_{red}$. As another example, before applying the vector-matrix multiplication, the average of bdry$_{red}$ may be subtracted from each entry of bdry$_{red}$. As still another example, before applying the vector-matrix multiplication, a pixel value of the first entry of bdry$_{red}$ may be subtracted from each entry of bdry$_{red}$.

As an exemplary implementation, the video encoder and decoder may calculate an average of the boundary vector bdry$_{red}$ and apply the vector-matrix multiplication to a vector obtained by subtracting the average from each entry of the boundary vector bdry$_{red}$. An input boundary vector input$_{red}$ to be input to the vector-matrix multiplication operation may be defined as follows. Here, p_avr is the average of the boundary vector bdry$_{red}$, and bitDepth denotes the luma bit-depth.

When MipSizeId (=idx(W,H)) is 0 or 1, input$_{red}$[0]=p_avr-(1<<(bitDepth-1))

input$_{red}$[j]=bdry$_{red}$[j]-p_avr,j=1, . . . ,size(bdry$_{red}$)-1.

When MipSizeId (=idx(W,H)) is 2, input$_{red}$[j]=bdry$_{red}$[j+1]-p_avr,j=0, . . . ,size(bdry$_{red}$)-2.

As another exemplary implementation, in order to avoid calculating the average, the average may be replaced with the first entry of the boundary vector bdry$_{red}$. In this case, the input boundary vector input$_{red}$ to be input to the vector-matrix multiplication operation may be defined as follows.

When MipSizeId (=idx(W,H)) is 0 or 1, input$_{red}$[j]=bdry$_{red}$[j]-bdry$_{red}$[0],j=1, . . . ,size(bdry$_{red}$)-1 input$_{red}$[0]=bdry$_{red}$[0]-(1<<(bitDepth-1))

When MipSizeId (=idx(W,H)) is 2, input$_{red}$[j]=bdry$_{red}$[j+1]-bdry$_{red}$[0],j=0, . . . ,size(bdry$_{red}$)-2.

That is, when MipSizeId is 0 or 1, the first entry of the input boundary vector input$_{red}$ is obtained based on the difference between half ('1<<(bitDepth-1)') of the maximum value that can be expressed in bit depth and the first entry of the boundary vector bdry$_{red}$, and subsequent entries of the input boundary vector input$_{red}$ are obtained based on subtraction of the value of the first entry from each entry of the boundary vector bdry$_{red}$. When MipSizeId=2, the differential vector input$_{red}$ has a length of 7, and accordingly the weight matrices A2 of the set S2 used for this case each have 64 rows and 7 columns (in VVC draft 5, the weight matrices A2 each have 64 rows and 8 columns).

In addition, by using the matrix mWeight[x][y] obtained by pre-subtracting the offset vector from the weight matrices (A0, A1, A2), the offset vector b may be removed from pred$_{red}$=A·bdry$_{red}$+b, but predicted values with a slight error is obtained. According to the improved method, the predicted sample set pred$_{red}$[x][y] may be calculated as follows.

pred$_{red}$[x][y]=(((Σ$_{i=0}^{inSize-1}$mWeight[i][y*predSize+x]*input$_{red}$[i])+oW)>>6)+bdry$_{red}$[0]

Here, oW=32−32*(Σ$_{i=0}^{inSize-1}$p[i]), and inSize is the size of input$_{red}$[j].

Linear Interpolation

Interpolation is required when the number of entries in pred$_{red}$ is smaller than the number of samples in the prediction block. A down-sampled prediction block with a size of predW and predH is defined as follows.

pred$_{red}$[x][y], with x=0 . . . predW-1,y=0 . . . predH-1

A prediction block having a size (nTbW, nTbH) corresponding to a coding block, in which the prediction signals at the remaining positions would be generated by linear interpolation in each direction, is defined as follows.

predSamples[x][y], with x=0 . . . nTbW-1,y=0 . . . nTbH-1

Depending on the horizontal and vertical upsampling scale factors upHor (=nTbW/predW) and upVer (=nTbH/predH), some or all of the predSamples are filled from pred$_{red}$ as follows.

predSamples[(x+1)*upHor-1][(y+1)*upVer-1]=pred$_{red}$[x][y]

When upHor=1, all positions in the horizontal direction of predSamples are filled from pred$_{red}$. When upVer=1, all positions in the vertical direction of predSamples are filled from pred$_{red}$.

Thereafter, the remaining empty samples of predSamples are filled through bi-linear interpolation. Interpolation in the horizontal direction and interpolation in the vertical direction are upsampling processes. The interpolations may be performed in a fixed order regardless of the size of the coding block. For example, interpolation may be performed first in the horizontal direction of the coding block, followed by interpolation in the vertical direction. In this case, clipping may be performed before upsampling, such that values of pred$_{red}$[x][y] or predSamples[x][y] are between 0 and $2^{bitDepth}-1$. $2^{bitDepth}-1$ is the maximum value that can be expressed in bit depth.

For interpolation, pred$_{red}$ and reference pixels of a neighboring block may be referred to as follows. For example, above original reference samples may be allocated to values of predSamples[x][-1], and left original reference samples may be allocated to values of predSamples[-1][y]. As another example, luma samples in neighboring blocks before or after LMCS may be allocated to predSamples[x][-1] positions and predSamples[-1][y] positions. As still another example, luma samples in neighboring blocks before or after block boundary filtering for intra-prediction around a coding block may be allocated to predSamples[x][−1] positions and predSamples[−1][y] positions.

mip_transpose_flag

As described above, VVC draft 5 supports up to 35 MIP modes according to the size and shape of a CU. For example, 35 modes are available for a CU with max(W, H)<=8 && W*H<32. For CUs each having max(W, H)=8 and max(W, H)>8, 19 and 11 modes are used, respectively. In addition, a pair of modes (two modes) may share a matrix and offset vector to reduce memory requirements. For example, for a 4×4 coding block, mode 19 uses a transposed matrix of the matrix assigned to mode 2. Furthermore, by concatenating $bdry_{red}^{top}$ and $bdry_{red}^{left}$ in an order determined according to the MIP mode and the size of the block, a boundary vector $bdry_{red}$ to be input to the vector-matrix multiplication is generated.

An improved approach may be used that may achieve substantially equivalent levels of coding efficiency while reducing complexity. According to another aspect of the present disclosure, instead of the existing method in which one mode uses the transpose of the matrix used by the other mode, a new method configured to change the order of concatenating $bdry_{red}^{top}$ and $bdry_{red}^{left}$ constituting a boundary vector $bdry_{red}$ used for vector-matrix multiplication for each mode may be used. The video encoder may signal a syntax element (mip_transpose_flag) indicating an order in which $bdry_{red}^{top}$ and $bdry_{red}^{left}$ are concatenated to constitute the boundary vector $bdry_{red}$ for each mode. When the syntax element (mip_transpose_flag) indicates concatenation in order of $bdry_{red}^{left}$ and $bdry_{red}^{top}$, a prediction matrix obtained through the matrix-vector multiplication operation may also be transposed. According to this method, the number of available MIP modes may be reduced by half compared to the conventional method, and coding complexity in terms of boundary vector generation and vector-matrix multiplication may be reduced.

Signaling of MIP Mode

For a coding unit (CU) coded in the intra-prediction mode, a flag indicating whether the intra-prediction type is matrix-based intra-prediction (MIP) may be signaled. When MIP is applied to a current CU, a syntax element which indicates a MIP mode used in the current CU among a plurality of available MIP modes may be additionally signaled.

Unlike the traditional intra-prediction mode as shown in FIGS. 3A and 3B (i.e., regular intra-prediction mode), the MPM list may not be used for signaling the MIP mode. Instead, for example, one syntax element (e.g., intra_mip_mode) that indicates an MIP mode used in the current CU among the plurality of MIP modes and may be coded with a truncated binary code may be used.

A part of an exemplary coding unit syntax proposed based on the VVC draft 5 is provided below. In the syntax below, the graying of elements is used to provide understanding.

TABLE 5 if( CuPredMode[ x0 ][ y0 ]  = =  MODE_INTRA ) {
  if( treeType = = SINGLE_TREE  | |  treeType = =

TABLE 5-continued

DUAL_TREE_LUMA ) {
  if( sps_bdpcm_enabled_flag &&
    cbWidth <= MaxTsSize  &&  cbHeight <= MaxTsSize  )
    intra_bdpcm_flag[ x0 ][ y0 ]
  if( intra_bdpcm_flag[ x0 ][ y0 ] )
    intra_bdpcm_dir_flag[ x0 ][ y0 ]
  else {
    if(  sps_mip_enabled_flag  &&
      ( Abs( Log2( cbWidth ) − Log2( cbHeight ) ) <= 2 )  &&
      cbWidth <= MaxTbSizeY  &&  cbHeight <=
      MaxTbSizeY )
    intra_mip_flag[ x0 ][ y0 ]
  if( intra_mip_flag[ x0 ][ y0 ] )
    intra_mip_mode[ x0 ][ y0 ]

When intra_mip_flag[x0][y0] is 1, it indicates that the intra-prediction type of the current block is MIP. When intra_mip_flag[x0][y0] is 0, it indicates that the intra-prediction type of the current block is regular intra-prediction, not MIP. When intra_mip_flag[x0][y0] is not present, it may be inferred to be equal to 0. intra_mip_mode[x0][y0] indicates an MIP mode used for the current block in MIP, and is expressed as a truncated binary code.

MPM (Most Probable Mode)

In a conventional approach, intra-prediction coding employing Most Probable Mode (MPM) may be used. For example, in HEVC, a list of three MPMs is configured from the intra-prediction modes of the left and above blocks. The drawback of this method is that more modes (intra-modes other than the MPM) belong to non-MPMs that need to be coded with more bits. Several methods have been proposed to extend the number of MPMs to 3 or more entries (e.g., 6 MPM modes). However, configuring such an MPM list with more entries may require more checks and conditions, which may make implementation more complex.

In order to keep the complexity of configuration of an MPM list low, an MPM list including six MPM candidates may be configured using intra-prediction modes of a left neighboring block and an above neighboring block adjacent to the current block. The MPM candidates may include a default intra-prediction mode (e.g., a PLANAR mode), an intra-prediction mode of a neighboring block, and an intra-prediction mode derived from the intra-prediction mode of the neighboring block. When the intra-prediction mode of the neighboring block is not used (for example, when the neighboring block is inter-predicted, or the neighboring block is located in a different slice or another tile), the intra-prediction mode of the neighboring block may be set to PLANAR.

According to the type of intra-prediction mode of the mode (Left) of the left block and the mode (Above) of the above block, it is largely divided into 4 cases. When Left and Above are different from each other, and the two modes are directional modes, it may be further divided according to the difference of the Left and Above to generate an MPM list. In the table below, Max refers to the larger mode between the Left and the Above, and MIN refers to the smaller mode between the Left and the Above.

TABLE 6

| Condition | Detailed condition | MPM modes |
|---|---|---|
| Left mode and Above mode are directional mode and are the same | | {Planar, Left, Left − 1, Left + 1, Left − 2, Left + 2} |
| Left mode and Above mode are different, both modes are directional mode | 2 ≤ Max-Min ≤ 62 | {Planar, Left, Above, DC, Max − 1, Max + 1} |
| | otherwise | {Planar, Left, Above, DC, Max − 2, Max + 2} |

TABLE 6-continued

| Condition | Detailed condition | MPM modes |
| --- | --- | --- |
| Left mode and Above mode are different, and only one of them is directional mode | | {Planar, Max, Max − 1, Max + 1, Max − 2, Max + 2} |
| Left mode and Above mode are non-directional mode (i.e., Planar or DC) | | {Planar, DC, Angular50, Angular18, Angular46, Angular54} |

The video encoder may signal a 1-bit flag (e.g., mpm_flag) indicating whether the intra-prediction mode of the current block corresponds to MPM. Typically, when the intra-prediction mode of the current block corresponds to MPM, an MPM index indicating one of 6 MPMs is additionally signaled. Note that in Table 6, the PLANAR mode is always included in the MPM list. That is, 6 MPMs may be divided into PLANAR and 5 non-PLANAR MPMs. Therefore, it may be efficient that the encoder explicitly signals whether the intra-prediction mode of the current block is the PLANAR mode (e.g., using a 1-bit flag) when the intra-prediction mode of the current block is an MPM mode, and additionally signals an MPM index indicating one of the other five non-PLANAR MPMs when the intra-prediction mode of the current block is the same as one of the other five non-PLANAR MPMs. When the intra-prediction mode of the current block does not correspond to any MPM, a syntax element indicating one of the remaining 61 non-MPMs excluding the 6 MPMs may be encoded using a truncated binary code.

A. Removal of a Mapping Table Between MIP Mode and Regular Mode

In VVC draft 5, an MPM list is used for signaling of the MIP mode and the regular mode, and a mapping table between the MIP mode and the regular mode is required to configure the MIP list. Due to the characteristics of the MIP technique including an averaging operation and an interpolation operation, the residual signal of a block to which MIP is applied may have a low frequency component dominant in the transform domain. The characteristics of the residual signal may be similar to the residual signal of a block to which the PLANAR mode or DC mode is applied. Therefore, in deriving an MPM list of blocks coded in the regular intra-prediction mode, the use of a mapping table between the MIP mode and the regular mode may be avoided from the perspective of the similarity of the residual signals.

According to an aspect of the present disclosure, in deriving an MPM list for a block (i.e., a regular block) coded in the regular intra-prediction mode, when a neighboring block is coded in the MIP mode, the intra-prediction mode of the neighboring block may be regarded as the PLANAR mode (or DC mode). For example, when the MIP mode is applied to the neighboring block, the PLANAR mode (or DC mode) may be added to the MPM list instead of the MIP mode of the neighboring block. Thereby, the need for the encoder and decoder to store the mapping table between the MIP mode and the regular mode in the memory is eliminated.

Similarly, even when a chroma DM (direct mode) is derived, if MIP is applied to a collocated luma block, the intra-prediction mode of the luma block may be regarded as the PLANAR mode (or DC mode), instead of using a mapping table between the MIP mode and the regular mode. The video decoder parses a syntax element specifying an intra-prediction mode for a chroma block, and the syntax element may indicates that the intra-prediction mode of the chroma block employs the intra-prediction mode of the collocated luma block. In such case, when MIP is applied to the collocated luma block, the intra-prediction mode of the luma block may be regarded as the PLANAR mode (or DC mode). That is, when MIP is applied to a collocated luma block in the chroma direct mode (DM), it may be determined that the intra-prediction mode of the chroma block is the PLANAR mode (or DC mode).

B. Integration of MIP Mode into Regular Intra-Mode

In VVC draft 5, MIP is treated as a separate intra-prediction type different from regular intra-prediction, and whether MIP is used is signaled at the CU level, using intra_mip_flag. When MIP is used, an MIP mode selected for the current CU is coded. When the MIP is not used, the regular intra-prediction mode selected for the current CU is coded. In the following, an alternative approach that may improve the signaling efficiency of the intra-prediction mode is presented. The proposed approach is based on replacing one of the regular modes (e.g. PLANAR, DC, or directional mode) with an MIP mode or adding the MIP mode as one of the regular modes. Replacing one of the regular modes with the MIP mode may be useful when there is possible redundancy between the MIP mode and a certain regular mode. In this case, the proposed approach may improve the signaling efficiency of the intra-prediction mode.

A description will be exemplarily given of a method of decoding the intra-prediction mode of a coding block in the case where the DC mode among the 67 modes described above is replaced with the MIP mode.

The video decoder may use the MPM list to determine intra_predictiton_mode[x0][y0]] for the coding block. The video decoder may decode MPM related syntax elements to determine intra_predictiton_mode[x0][y0]. When the value of intra_predictiton_mode[x0][y0] is one of $\{0, 2, \ldots, 66\}$, the intra-prediction type of the coding block is set to regular intra-prediction. When the value of intra_predictiton_mode[x0][y0] is 1 (which was originally the mode index of INTRA DC), the video decoder sets the intra-prediction type of the coding block to MIP, and decodes a syntax element indicating an MIP prediction mode used for encoding of the coding block.

An MPM list including, for example, 6 MPM candidates may be configured using intra-prediction modes of a left block and an above block adjacent to the current coding block. It is largely divided into 4 cases depending on whether the mode (Left) of the left block and the mode (Above) of the above block are directional modes. When Left and Above are different from each other, and both modes are directional modes, two more cases may be included according to the difference of the Left and Above to generate an MPM list. In Table 7 below, Max refers to the larger mode between the Left and the Above, and MIN refers to the smaller mode between the Left and the Above.

TABLE 7

| Condition | Detailed condition | MPM modes |
| --- | --- | --- |
| Left mode and Above mode are directional mode and are the same | | {Planar, Left, Left − 1, Left + 1, MIP, Left − 2} |
| Left mode and Above mode are different, both modes are directional mode | 2 ≤ Max-Min ≤ 62 | {Planar, Left, Above, MIP, Max − 1, Max + 1} |
| | otherwise | {Planar, Left, Above, MIP, Max − 2, Max + 2} |
| Left mode and Above mode are different, and only one of them is directional mode | | {Planar, Max, MIP, Max − 1, Max + 1, Max − 2} |
| Left mode and Above mode are non-directional mode (i.e., Planar or DC) | | {Planar, MIP, Angular50, Angular18, Angular46, Angular54} |

Note that in Table 7, the MIP mode is always included in the MPM list. That is, six MPMs may be divided into one MIP and five non-MIP MPMs. Therefore, it may be efficient for the encoder 1) to first signal whether the intra-prediction mode of the current block is an MIP mode (e.g., using a 1-bit flag) when the intra-prediction mode of the current block is an MPM mode and 2) to additionally signal an MPM index indicating one of the other five non-MIP MPMs when the intra-prediction mode of the current block is not the MIP mode. When the intra-prediction mode of the current block is not any MPM, a syntax element indicating one of the remaining 61 non-MPMs excluding the six MPMs may be encoded using a truncated binary code.

While the regular intra-prediction mode may be applied together with the Multiple reference line (MRL) and Intra sub-partition (ISP) of VVC, the MIP mode is available only in the case where the MRL index is 0 (that is, reference samples of the first line are used) and in the case where the ISP is not applied. However, the MIP mode may be available regardless of whether MRL and ISP are applied.

A part of an exemplary intra-prediction mode related syntax is provided below. In the syntax below, the graying of elements is used to provide understanding.

TABLE 8

```
if( intra_luma_ref_idx[ x0 ][ y0 ] = = 0 )
    intra_luma_mpm_flag[ x0 ][ y0 ]
if( intra_luma_mpm_flag[ x0 ][ y0 ] ) {
    if( intra_luma_ref_idx[ x0 ][ y0 ] = = 0 )
        intra_luma_not_MIP_flag[ x0 ][ y0 ]
        if( !intra_luma_not_MIP_flag[ x0 ][ y0 ] )
            intra_mip_mode[ x0 ][ y0 ]
        if( intra_luma_not_MIP_flag[ x0 ][ y0 ] )
            intra_luma_mpm_idx[ x0 ][ y0 ]
} else
    intra_luma_mpm_remainder[ x0 ][ y0 ]
}
```

The intra-prediction mode for the coding block of the luma component may be signaled using syntax elements including intra_luma_mpm_flag, intra_luma_not_MIP_flag, intra_luma_mpm_idx, intra_mip_mode, and intra_luma_mpm_remainder.

intra_luma_mpm_flag indicates whether the intra-prediction mode of the coding block is an MPM mode. When intra_luma_mpm_flag is not present, it is inferred that intra_luma_mpm_flag is equal to 1. intra_luma_not_MIP_flag indicates whether the intra-prediction mode of the coding block is the MIP mode. When intra_luma_not_MIP_flag is 1, it indicates that the intra-prediction mode of the coding block is not the MIP mode (that is, it is a regular intra-mode). intra_mip_mode may specify one MIP mode among a plurality of MIP modes available for the size of the current coding block, and may be coded with a truncated binary code. When intra_luma_mpm_flag is not present, it is inferred that intra_luma_mpm_flag is equal to 1.

intra_luma_mpm_idx specifies one MPM mode identical to the intra-prediction mode of the coding block among the five non-MIP MPMs. intra_luma_mpm_remainder specifies one non-MPM mode identical to the intra-prediction mode of the coding block among the non-MPMs. intra_luma_mpm_remainder may be coded with a truncated binary code.

Referring to Table 8, when intra_luma_mpm_flag is 1 and MRL INDEX is 0 (i.e., intra_luma_ref_idx=0), the video decoder parses intra_luma_not_MIP_flag. When intra_luma_not_MIP_flag is 0, the intra-prediction type of the coding block is MIP, and thus the video decoder decodes intra_mip_mode to identify the MIP mode used in the coding block. When intra_luma_not_MIP_flag is 1, the video decoder configures an MPM list consisting of 5 non-MIP MPMs and decodes intra_luma_mpm_idx indicating MPM INDEX. When intra_luma_mpm_flag is 0, intra_luma_mpm_remainder is decoded.

Figure 9:
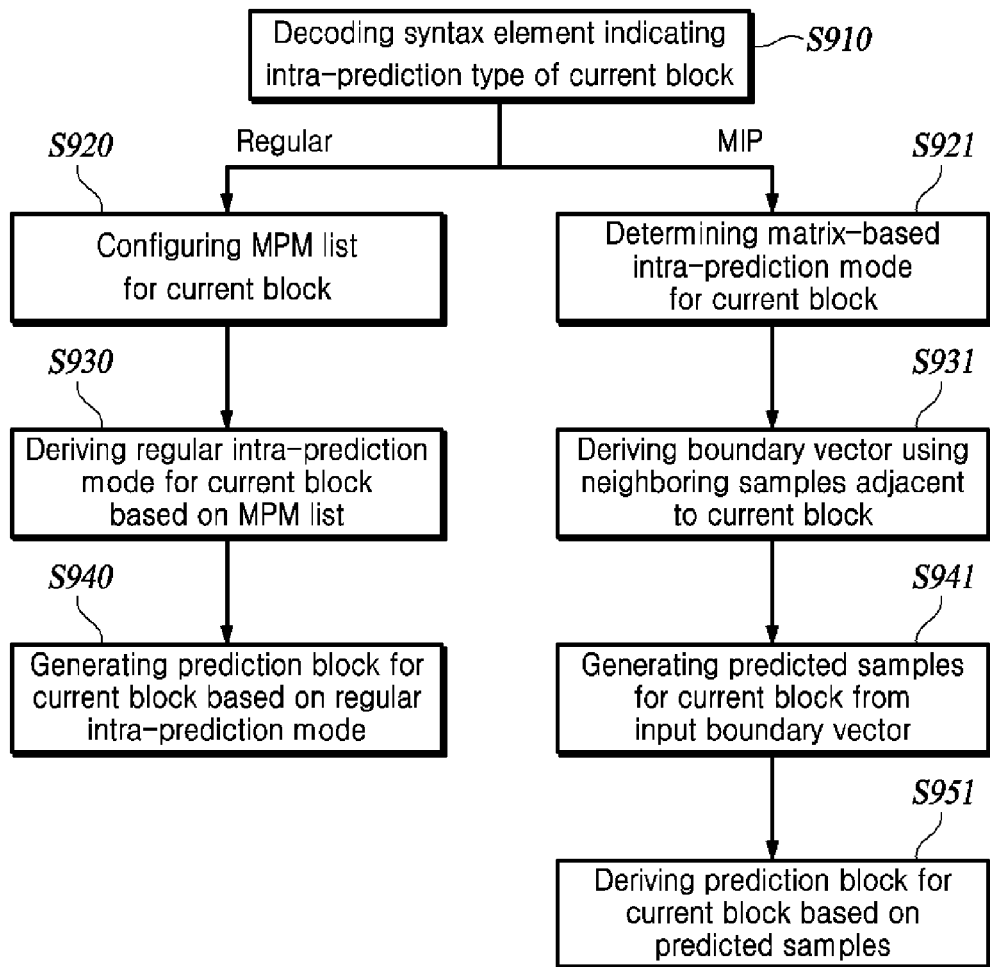
FIG. 9 is a flowchart illustrating a method of decoding video data according to an embodiment of the present disclosure.

FIG. 9 is a flowchart illustrating a method of decoding video data adopting some of the above improvements according to an embodiment of the present disclosure.

The video decoder may decode a syntax element indicating an intra-prediction type of the current block of video data from the bitstream (S910). Intra-prediction types include matrix based intra-prediction (MIP) and regular intra-prediction. The syntax element may be a truncated binary code specifying one of a plurality of MIP modes allowed for the size and shape of the current block.

The video decoder may generate a prediction block for the current block by selectively performing MIP or regular intra-prediction based on the intra-prediction type of the current block.

In generating the prediction block for the current block by performing regular intra-prediction, the video decoder may perform the following operations (S920 to S940). The video decoder may configure an MPM list for the current block by deriving Most Probable Mode (MPM) candidates based on the regular intra-prediction mode of the neighboring blocks adjacent to the current block (S920), and derive a regular intra-prediction mode for the current block based on the MPM list (S930). In deriving MPM candidates based on the regular intra-prediction mode of the neighboring blocks, the video decoder may set (regard) the regular intra-prediction mode of the neighboring blocks as the PLANAR mode when the intra-prediction type of the neighboring blocks is matrix-based intra-prediction. The decoder may generate a prediction block for the current block based on the regular intra-prediction mode of the current block (S940).

In generating the prediction block for the current block by performing matrix-based intra-prediction, the video decoder may perform the following operations (S921 to S951). The video decoder may decode a syntax element indicating a matrix-based intra-prediction mode for the current block from the bitstream in order to determine the matrix-based intra-prediction mode for the current block (S921). The video decoder may derive an input boundary vector using neighboring samples adjacent to the current block based on the width and height of the current block (S931), and may generate predicted samples for the current block based on matrix-vector multiplication between a matrix predefined for the matrix-based intra-prediction mode for the current block and the input boundary vector (S941). The video decoder may derive the prediction block for the current block by performing clipping and linear interpolation based on the predicted samples (S951).

In order to derive the input boundary vector using neighboring samples adjacent to the current block, the video decoder generates an initial boundary vector filled with the value of the neighboring samples adjacent to the current block or down-sampled values from the neighboring samples according to the width and height of the current block, and may remove the DC component from the initial boundary vector to generate an input boundary vector to which the matrix-vector multiplication is to be applied. For example, removing the DC component from the initial boundary vector may be or include subtracting the value of the first entry from each entry in the initial boundary vector. The first entry in the input boundary vector may be obtained based on the difference between half of the maximum value that can be expressed in bit depth and the first entry of the initial boundary vector, and subsequent entries of the input boundary vector may be obtained based on the subtraction of the value of the first entry from each entry in the initial boundary vector.

To generate the initial boundary vector, the video decoder may decode, from the bitstream, a syntax element indicating the concatenation order of first entries of the initial boundary vector derived from left neighboring samples adjacent to the current block and second entries of the initial boundary vector derived from the above neighboring samples adjacent to the current block. The video decoder may generate the initial boundary vector by concatenating the first entries and the second entries according to the concatenation order.

In order to derive the prediction block for the current block based on the predicted samples, the video decoder may allocate the predicted samples to positions in the prediction block, and perform horizontal interpolation and vertical interpolation on the predicted samples, left neighboring samples adjacent to the current block, and above neighboring samples adjacent to the current block to generate predicted sample values for positions to which to which the predicted samples are not allocated the prediction block. The horizontal interpolation may be performed prior to the vertical interpolation.

When the current block is a luma block composed of a luma component and MIP is applied to the luma block, the intra-prediction mode of the chroma block may be set to the PLANAR mode if the intra-prediction mode of the luma block is to be used as the intra-prediction mode of the chroma block corresponding to the luma block.

It should be understood that the exemplary embodiments described above may be implemented in many different ways. The functions or methods described in one or more examples may be implemented in hardware, software, firmware, or any combination thereof. It should be understood that the functional components described herein have been labeled "unit" to further emphasize their implementation independence.

Various functions or methods described in the present disclosure may be implemented with instructions stored in a non-transitory recording medium that may be read and executed by one or more processors. Non-transitory recording media include, for example, all types of recording devices in which data is stored in a form readable by a computer system. For example, non-transitory recording media include storage media such as erasable programmable read only memory (EPROM), flash drives, optical drives, magnetic hard drives, and solid state drives (SSDs).

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:
1. A method of decoding video data, comprising:
decoding, from a bitstream, a syntax element indicating an intra-prediction type of a current block of the video data, the intra-prediction type being indicated from among matrix based intra-prediction (MIP) and regular intra-prediction; and
generating a prediction block for the current block by selectively performing the MIP or the regular intra-prediction based on the intra-prediction type of the current block indicated by the syntax element,
wherein generating the prediction block for the current block by performing the MIP comprises:
decoding, from the bitstream, a syntax element indicating an MW mode for the current block, the syntax element being represented as a truncated binary code specifying one of a plurality of MIP prediction modes allowed for a width and a height of the current block;
deriving an input boundary vector using neighboring samples adjacent to the current block based on the width and the height of the current block;
generating predicted samples for the current block based on matrix-vector multiplication between the input boundary vector and a matrix predefined for the MW mode; and
deriving the prediction block for the current block based on the predicted samples,
wherein deriving the input boundary vector using the neighboring samples adjacent to the current block comprises:
generating an initial boundary vector filled with the neighboring samples adjacent to the current block or down-sampled values from the neighboring samples according to the width and the height of the current block; and
from the initial boundary vector, generating an input boundary vector to which the matrix-vector multiplication is applied, and
where a first entry of the input boundary vector is obtained based on a difference between half of a maximum value allowed to be expressed in bit depth and the first entry of the initial boundary vector, and subsequent entries of the input boundary vector are obtained based on subtraction of a value of the first entry from each entry of the initial boundary vector.

2. The method of claim 1, wherein generating the initial boundary vector comprises:
　　decoding, from the bitstream, a syntax element indicating a concatenation order of first entries of the initial boundary vector derived from the left neighboring samples adjacent to the current block and second entries of the initial boundary vector derived from the above neighboring samples adjacent to the current block; and
　　concatenating the first entries and the second entries according to the concatenation order and thereby generating the initial boundary vector.

3. The method of claim 1, wherein deriving the prediction block for the current block based on the predicted samples comprises:
　　allocating the predicted samples to positions in the prediction block; and
　　generating predicted sample values for positions to which the predicted samples are not allocated in the prediction block, by performing horizontal interpolation and vertical interpolation on the predicted samples, left neighboring samples adjacent to the current block, and above neighboring samples adjacent to the current block.

4. The method of claim 3, wherein the horizontal interpolation is performed prior to the vertical interpolation.

5. The method of claim 3, wherein, before the horizontal interpolation and the vertical interpolation are performed, clipping is performed on the predicted samples such that the predicted samples lie between 0 and $2^{bitDepth}-1$.

6. The method of claim 1, wherein the current block is a luma block composed of a luma component,
　　wherein, when the MIP is performed on the luma block, and the intra-prediction mode of the luma block is used as an intra-prediction mode of a chroma block corresponding to the luma block, an intra-prediction mode of the chroma block is set as a PLANAR mode.

7. The method of claim 1, wherein generating the prediction block for the current block by performing the regular intra-prediction comprises:
　　deriving Most Probable Mode (MPM) candidates based on a regular intra-prediction mode of each of neighboring blocks adjacent to the current block and thereby configuring an MPM list for the current block; and
　　deriving a regular intra-prediction mode for the current block based on the MPM list, wherein, when an intra-prediction type of the neighboring blocks is the MIP, the regular intra-prediction mode of the neighboring block is regarded as a PLANAR mode.

8. A method of encoding video data, comprising:
　　encoding a syntax element indicating an intra-prediction type of a current block of the video data, the intra-prediction type being indicated from among matrix based intra-prediction (MW) and regular intra-prediction;
　　generating a prediction block for the current block by selectively performing the MIP or the regular intra-prediction based on the intra-prediction type of the current block indicated by the syntax element; and
　　encoding a residual block that is a difference between the current block and the prediction block,
　　wherein generating the prediction block for the current block by performing the MIP comprises:
　　　　encoding a syntax element indicating an MIP mode for the current block, the syntax element being represented as a truncated binary code specifying one of a plurality of MIP prediction modes allowed for a width and a height of the current block;
　　　　deriving an input boundary vector using neighboring samples adjacent to the current block based on the width and the height of the current block;
　　　　generating predicted samples for the current block based on matrix-vector multiplication between the input boundary vector and a matrix predefined for the MW mode; and
　　　　deriving the prediction block for the current block based on the predicted samples,
　　wherein deriving the input boundary vector using the neighboring samples adjacent to the current block comprises:
　　　　generating an initial boundary vector filled with the neighboring samples adjacent to the current block or down-sampled values from the neighboring samples according to the width and the height of the current block; and
　　　　from the initial boundary vector, generating an input boundary vector to which the matrix-vector multiplication is applied, and
　　where a first entry of the input boundary vector is obtained based on a difference between half of a maximum value allowed to be expressed in bit depth and the first entry of the initial boundary vector, and subsequent entries of the input boundary vector are obtained based on subtraction of a value of the first entry from each entry of the initial boundary vector.

9. The method of claim 8, wherein generating the initial boundary vector comprises:
　　encoding a syntax element indicating a concatenation order of first entries of the initial boundary vector derived from the left neighboring samples adjacent to the current block and second entries of the initial boundary vector derived from the above neighboring samples adjacent to the current block; and
　　concatenating the first entries and the second entries according to the concatenation order and thereby generating the initial boundary vector.

10. A non-transitory computer readable medium storing a bitstream containing encoded data for video data, the bitstream generated by processes of:
　　encoding a syntax element indicating an intra-prediction type of a current block of the video data, the intra-prediction type being indicated from among matrix based intra-prediction (MW) and regular intra-prediction;
　　generating a prediction block for the current block by selectively performing the MIP or the regular intra-prediction based on the intra-prediction type of the current block indicated by the syntax element; and
　　encoding a residual block that is a difference between the current block and the prediction block,
　　wherein generating the prediction block for the current block by performing the MIP comprises:
　　　　encoding a syntax element indicating an MIP mode for the current block, the syntax element being represented as a truncated binary code specifying one of a plurality of MIP prediction modes allowed for a width and a height of the current block;
　　　　deriving an input boundary vector using neighboring samples adjacent to the current block based on the width and the height of the current block;
　　　　generating predicted samples for the current block based on matrix-vector multiplication between the input boundary vector and a matrix predefined for the MW mode; and deriving the prediction block for the current block based on the predicted samples, wherein deriving the input boundary vector using the neighboring samples adjacent to the current block comprises:

generating an initial boundary vector filled with the neighboring samples adjacent to the current block or down-sampled values from the neighboring samples according to the width and the height of the current block; and from the initial boundary vector, generating an input boundary vector to which the matrix-vector multiplication is applied, and where a first entry of the input boundary vector is obtained based on a difference between half of a maximum value allowed to be expressed in bit depth and the first entry of the initial boundary vector, and subsequent entries of the input boundary vector are obtained based on subtraction of a value of the first entry from each entry of the initial boundary vector.

11. The non-transitory computer readable medium of claim 10, wherein generating the initial boundary vector comprises:

encoding a syntax element indicating a concatenation order of first entries of the initial boundary vector derived from the left neighboring samples adjacent to the current block and second entries of the initial boundary vector derived from the above neighboring samples adjacent to the current block; and concatenating the first entries and the second entries according to the concatenation order and thereby generating the initial boundary vector.

* * * * *